US009781028B2

United States Patent
Ohnishi et al.

(10) Patent No.: US 9,781,028 B2
(45) Date of Patent: Oct. 3, 2017

(54) TRANSCODING AND DYNAMIC ERROR CORRECTION FOR CONTENT CENTRIC NETWORKS USING A PROXY SERVER

(71) Applicant: Panasonic Corporation, Osaka (JP)

(72) Inventors: Ryota Ohnishi, Osaka (JP); Takahiro Yoneda, Osaka (JP); Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 193 days.

(21) Appl. No.: 14/402,331

(22) PCT Filed: Mar. 14, 2014

(86) PCT No.: PCT/JP2014/001467
§ 371 (c)(1),
(2) Date: Nov. 20, 2014

(87) PCT Pub. No.: WO2014/156034
PCT Pub. Date: Oct. 2, 2014

(65) Prior Publication Data
US 2015/0095481 A1    Apr. 2, 2015

(30) Foreign Application Priority Data

Mar. 26, 2013 (JP) ................................ 2013-063441

(51) Int. Cl.
*G06F 15/173* (2006.01)
*H04L 12/721* (2013.01)
(Continued)

(52) U.S. Cl.
CPC .............. *H04L 45/14* (2013.01); *H04L 1/004* (2013.01); *H04L 45/306* (2013.01); *H04L 45/3065* (2013.01)

(58) Field of Classification Search
CPC ....... H04L 45/14; H04L 1/004; H04L 45/306; H04L 45/3065; H04L 67/1065
(Continued)

(56) References Cited

U.S. PATENT DOCUMENTS 9,400,852 B2 *   7/2016  Kim .................. G06F 17/30902
2003/0099298 A1 *   5/2003  Rose .................... H04N 21/234
                                                        375/240.27
(Continued)

FOREIGN PATENT DOCUMENTS

JP    2012-018525    1/2012
WO   2011/010688    1/2011
(Continued)

OTHER PUBLICATIONS

Angin, Oguz et al. "The Mobiware Toolkit: Programmable Support for Adaptive Mobile Networking". Aug. 1998. IEEE. pp. 1-14.*
(Continued)

*Primary Examiner* — Imad Hussain
(74) *Attorney, Agent, or Firm* — Wenderoth, Lind & Ponack, L.L.P.

(57) ABSTRACT

A server according to the present disclosure includes: a converting unit that converts content data to enhance a real-time property, and creates a packet of the converted content data; and a server control unit that updates a routing table that describes processing for an interest packet, wherein when an interest packet for content including converted content data is received, the server control unit performs control of issuing an interest packet for original content data of the content which is to be converted, and when original content data to be processed is received from a CCN, the server control unit performs control of causing the original content data to be converted, a packet of the converted original content data to be created, and the packet
(Continued)

of the converted original content data to be transmitted as a response packet for the interest packet for the content including the converted content data.

8 Claims, 18 Drawing Sheets

(51) Int. Cl.
  *H04L 1/00* (2006.01)
  *H04L 12/725* (2013.01)
(58) Field of Classification Search
  USPC ........................................................ 709/223
  See application file for complete search history.

(56) References Cited

U.S. PATENT DOCUMENTS

| | | | |
|---|---|---|---|
| 2008/0028279 A1* | 1/2008 | Ver Steeg | H04L 1/1829 714/776 |
| 2008/0147864 A1* | 6/2008 | Drogo De Iacovo | H04L 29/06027 709/226 |
| 2009/0092152 A1* | 4/2009 | Rajakarunanayake | H04L 1/0009 370/473 |
| 2011/0239078 A1* | 9/2011 | Luby | H04N 21/23106 714/752 |
| 2011/0265174 A1* | 10/2011 | Thornton | H04L 67/327 726/15 |
| 2011/0296051 A1* | 12/2011 | Vange | H04L 41/12 709/238 |
| 2012/0011281 A1 | 1/2012 | Hamada et al. | |
| 2012/0124159 A1 | 5/2012 | Takahashi | |
| 2012/0155464 A1 | 6/2012 | Kim et al. | |
| 2012/0203861 A1 | 8/2012 | Flack et al. | |
| 2012/0206645 A1 | 8/2012 | Ozawa | |
| 2013/0016695 A1* | 1/2013 | Ravindran | H04L 67/327 370/331 |
| 2013/0039249 A1* | 2/2013 | Ravindran | H04W 76/002 370/312 |
| 2013/0111063 A1* | 5/2013 | Lee | H04L 45/125 709/241 |
| 2013/0173822 A1* | 7/2013 | Hong | H04L 67/327 709/232 |
| 2013/0219038 A1* | 8/2013 | Lee | H04L 45/02 709/223 |
| 2013/0301415 A1* | 11/2013 | Archer | H04W 28/08 370/235 |
| 2014/0023076 A1* | 1/2014 | Calo | H04L 45/34 370/392 |
| 2014/0164328 A1* | 6/2014 | Calo | G06F 17/30575 707/626 |
| 2014/0164642 A1* | 6/2014 | Dilmaghani | H04L 45/08 709/238 |
| 2014/0173080 A1* | 6/2014 | Dilmaghani | H04L 67/327 709/223 |
| 2015/0058494 A1* | 2/2015 | Sharif-Ahmadi | G08C 17/02 709/231 |
| 2015/0312381 A1* | 10/2015 | Savolainen | H04L 51/38 709/204 |

FOREIGN PATENT DOCUMENTS

| | | |
|---|---|---|
| WO | 2011/049193 | 4/2011 |
| WO | 2012/088023 | 6/2012 |

OTHER PUBLICATIONS

Lee, Jihoon et al. "Proxy-assisted Content Sharing Using Content Centric Networking (CCN) for Resource-limited Mobile Consumer Devices". Jun. 2011. IEEE. pp. 477-483.*
International Search Report issued Apr. 28, 2014 in International (PCT) Application No. PCT/JP2014/001467.
V. Jacobson, D. K. Smetters, J. D. Thornton, M. F. Plass, N. H. Briggs, R. L. Braynard(PARC) Networking Named Content, CoNEXT 2009, Rome, Dec. 2009.
Cheng Yi, et al A Case for Stateful Forwarding Plane, NDN, Technical Report NDN-0002, 2012.

* cited by examiner

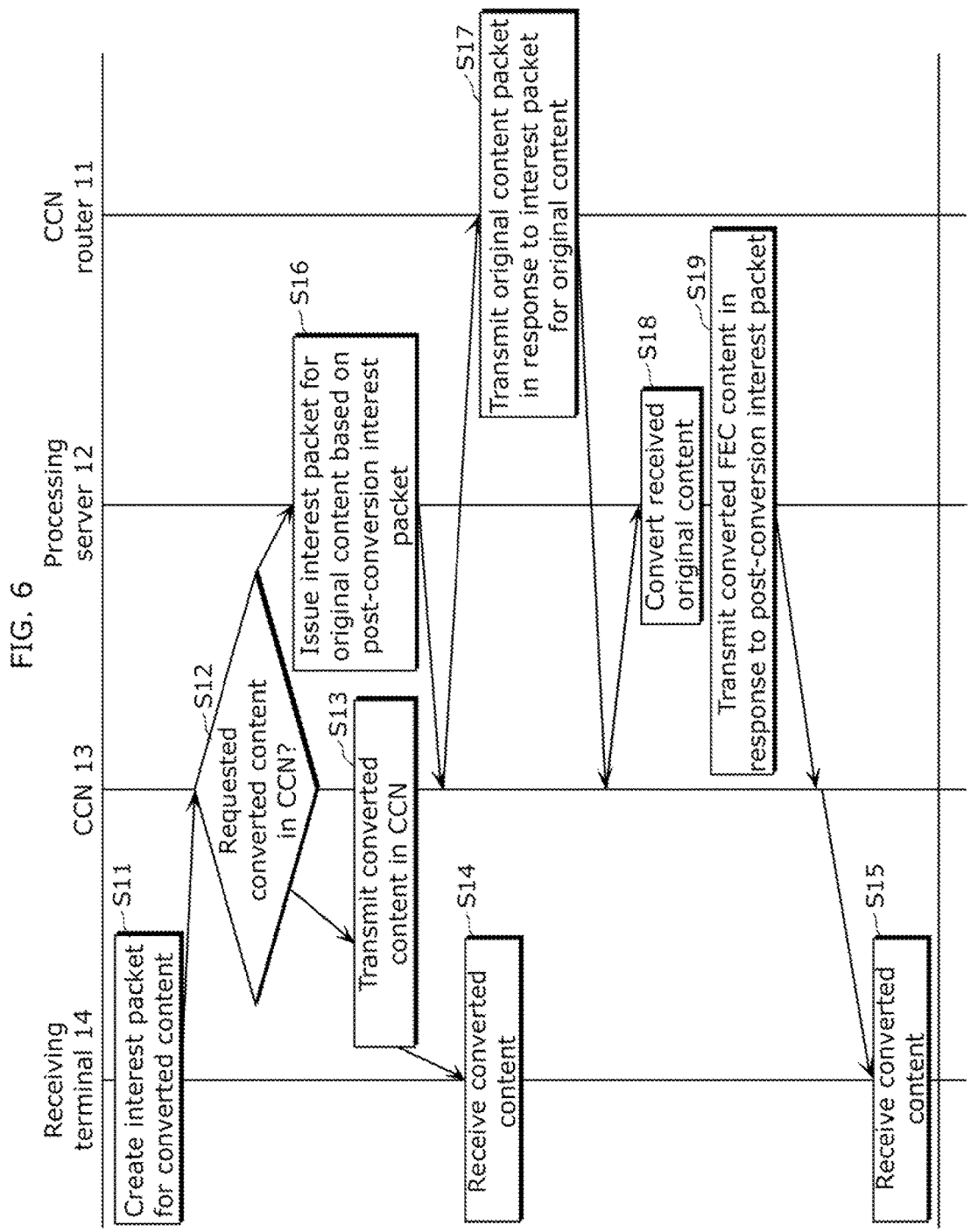

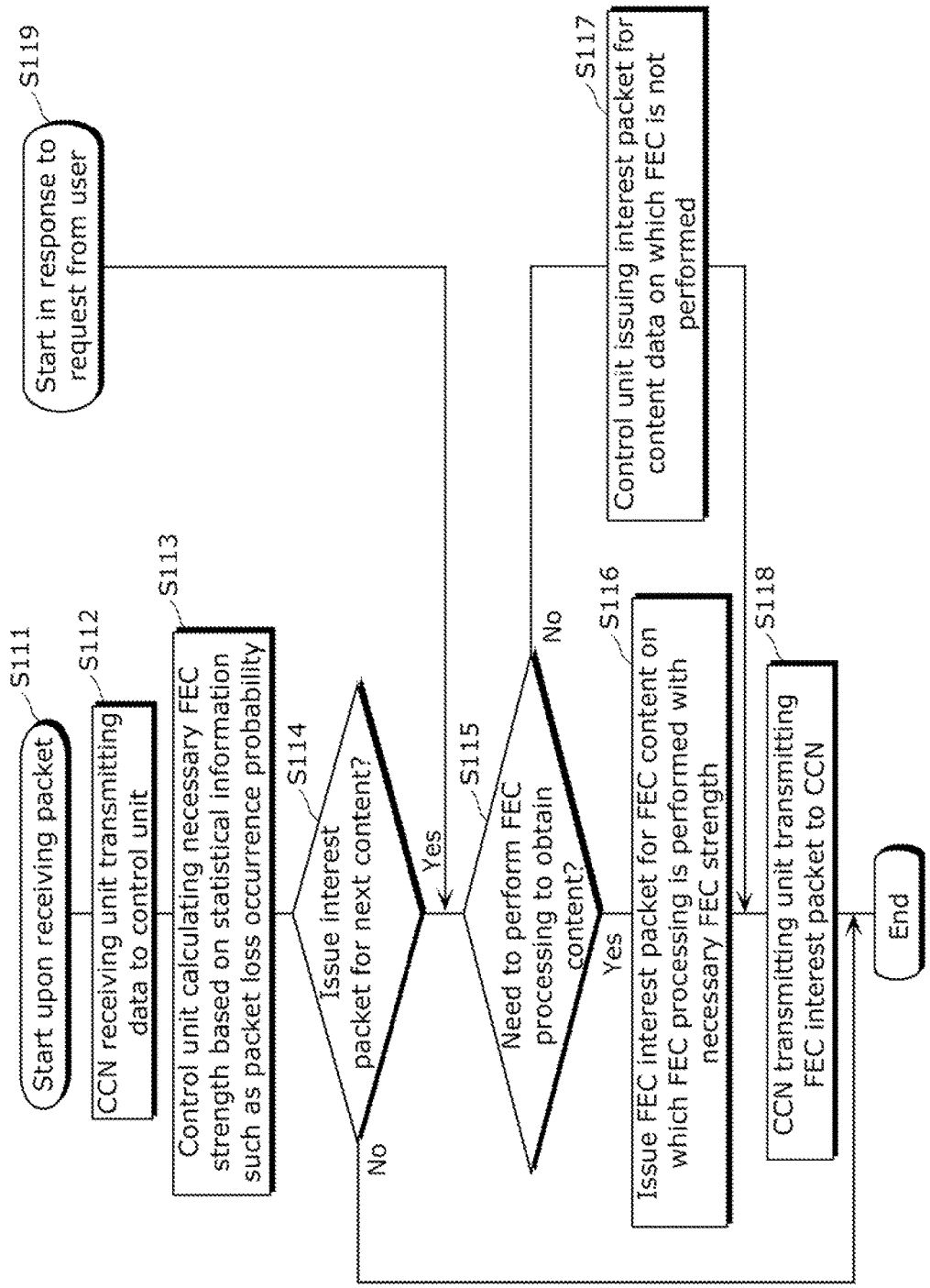

FIG. 10

| Prefix | Converted Interest | Incoming interface | Outgoing interface |
|---|---|---|---|
| /fec/test/video/512kbps/FEC=50% | /test/video/512kbps | 0 | 2.4 |
| | | | |
| | | | |

51 →
511, 512, 513, 514

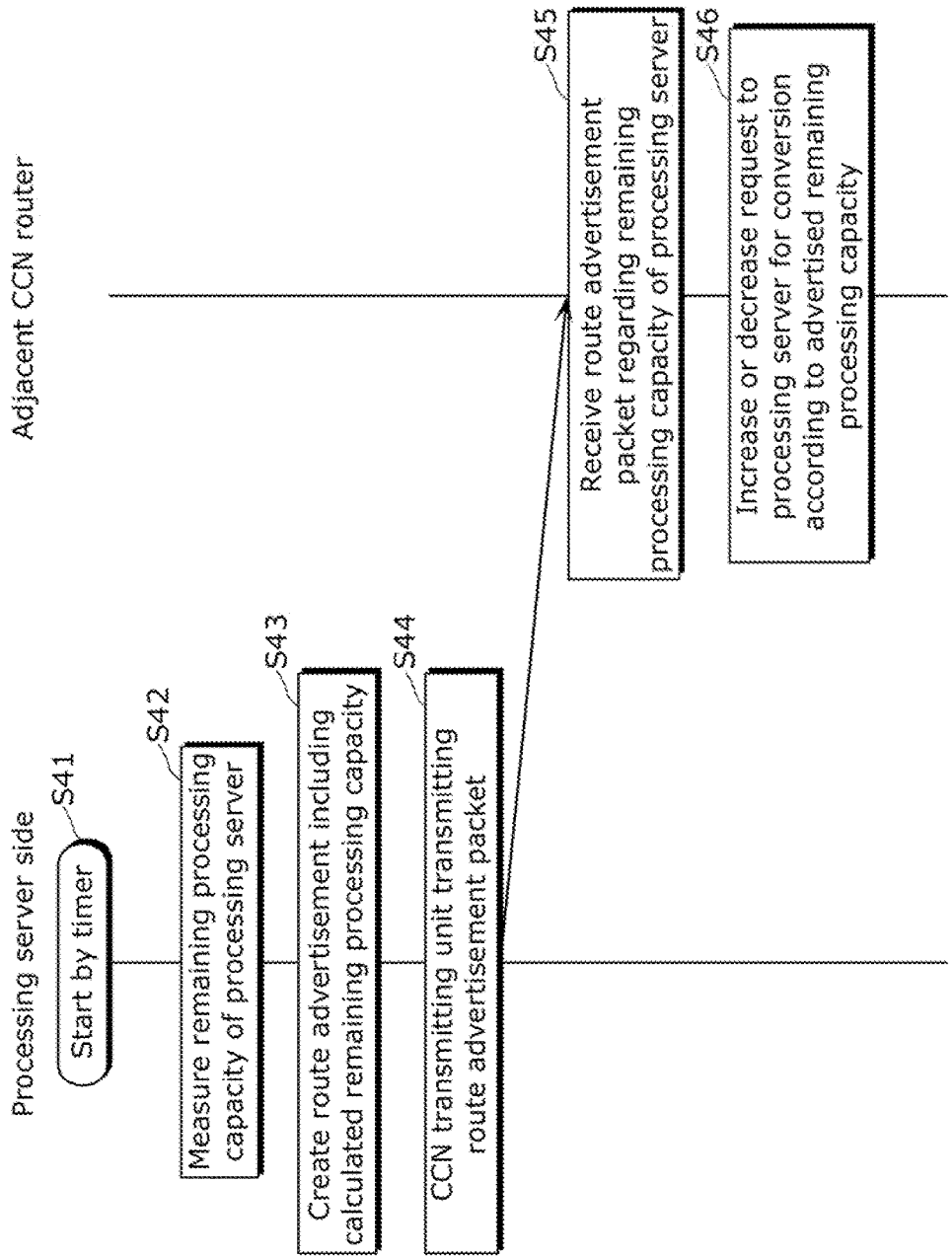

TRANSCODING AND DYNAMIC ERROR CORRECTION FOR CONTENT CENTRIC NETWORKS USING A PROXY SERVER

TECHNICAL FIELD

The present invention relates to servers, routers, receiving terminals, and processing methods, and particularly to a server, a router, a receiving terminal, and a processing method for performing real-time data distribution over a content centric network (CCN).

BACKGROUND ART

The CCN is a next-generation network architecture and a content distribution technique for managing content with a namespace and caching content in a router in a network (see Non Patent Literature (NPL) 1, for instance). Content distribution over the CCN is performed when a receiver who will receive content transmits an interest packet for the content.

More specifically, such a receiver is capable of specifying content with its namespace in the CCN to obtain the content without regard to a location where the content is stored. In this manner, the receiver is capable of efficiently receiving the content using the CCN.

Moreover, the CCN is a receiver-centric system in which a receiver who will receive content demands and obtains the content. For this reason, a lot of people can efficiently receive content of a video site or the like without sacrificing its quality, using the CCN.

Like communications in the Internet, however, packet loss is likely to occur due to congestion or the like in the content distribution using the CCN. There is a possibility that the occurrence of the packet loss leads to reduced communication quality, e.g., it is not possible to receive complete content data.

For this problem, a method for addressing packet loss in a CCN using retransmission has been known (see NPLs 1 and 2, and Patent Literature (PTL) 1, for example).

CITATION LIST

Patent Literature

[PTL 1] US Unexamined Patent Application Publication No. 2012/0155464

Non Patent Literature

[NPL 1] V. Jacobson, D. K. Smetters, J. D. Thornton, M. F. Plass, N. H. Briggs, R. L. Braynard (PARC) Networking Named Content, CoNEXT 2009, Rome, December, 2009.
[NPL 2] Cheng Yi, et al A Case for Stateful Forwarding Plane, NDN, Technical Report NDN-0002, 2012.

SUMMARY OF INVENTION

Technical Problem

Unfortunately, even when the packet loss in the CCN is addressed using the retransmission method disclosed in NPL 1, NPL 2, PTL 1, and so on, it is not possible to ensure a real-time property of obtaining content data.

The present invention has been conceived in view of the above situation, and an object of the present invention is to provide a server, a router, a receiving terminal, and a processing method that make it possible to ensure a real-time property of obtaining content data.

Solution to Problem

A server according to one aspect of the present invention is a server that processes a real-time stream transmitted via a content centric network (CCN), the server including: a CCN receiving unit configured to receive a packet from the CCN; a CCN transmitting unit configured to transmit a packet to the CCN; a converting unit configured to convert content data to enhance a real-time property, and create a packet of the converted content data; and a server control unit configured to update a routing table that describes processing for an interest packet, wherein the server control unit is configured to: when the CCN receiving unit receives an interest packet for content including converted content data, issue an interest packet for original content data of the content which is to be converted, and cause the CCN transmitting unit to transmit the issued interest packet; and when the CCN receiving unit receives from the CCN the original content data to be converted, cause the converting unit to convert the original content data and create a packet of the converted original content data, and cause the CCN transmitting unit to transmit the packet of the converted original content data as a response packet for the interest packet for the content including the converted content data.

This general and specific aspect may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The present invention provides a server, a router, a receiving terminal, and a processing method that make it possible to ensure a real-time property of obtaining content data.

BRIEF DESCRIPTION OF DRAWINGS

FIG. 6 is a sequential diagram showing a process flow of a content distribution system in Embodiment 1.

FIG. 7 is a diagram showing a process flow through which a receiving terminal issues an interest packet in Embodiment 1.

FIG. 10 is a diagram showing an exemplary structure of a routing table in Embodiment 1.

FIG. 18 is a diagram showing a process flow through which a processing server issues a route advertisement packet and a CCN router receives the route advertisement packet in Embodiment 5.

DESCRIPTION OF EMBODIMENTS (Background to the Obtainment of One Aspect of the Present Invention)

Hereinafter, a background to the obtainment of one aspect of the present invention will be described.

Figure 1:
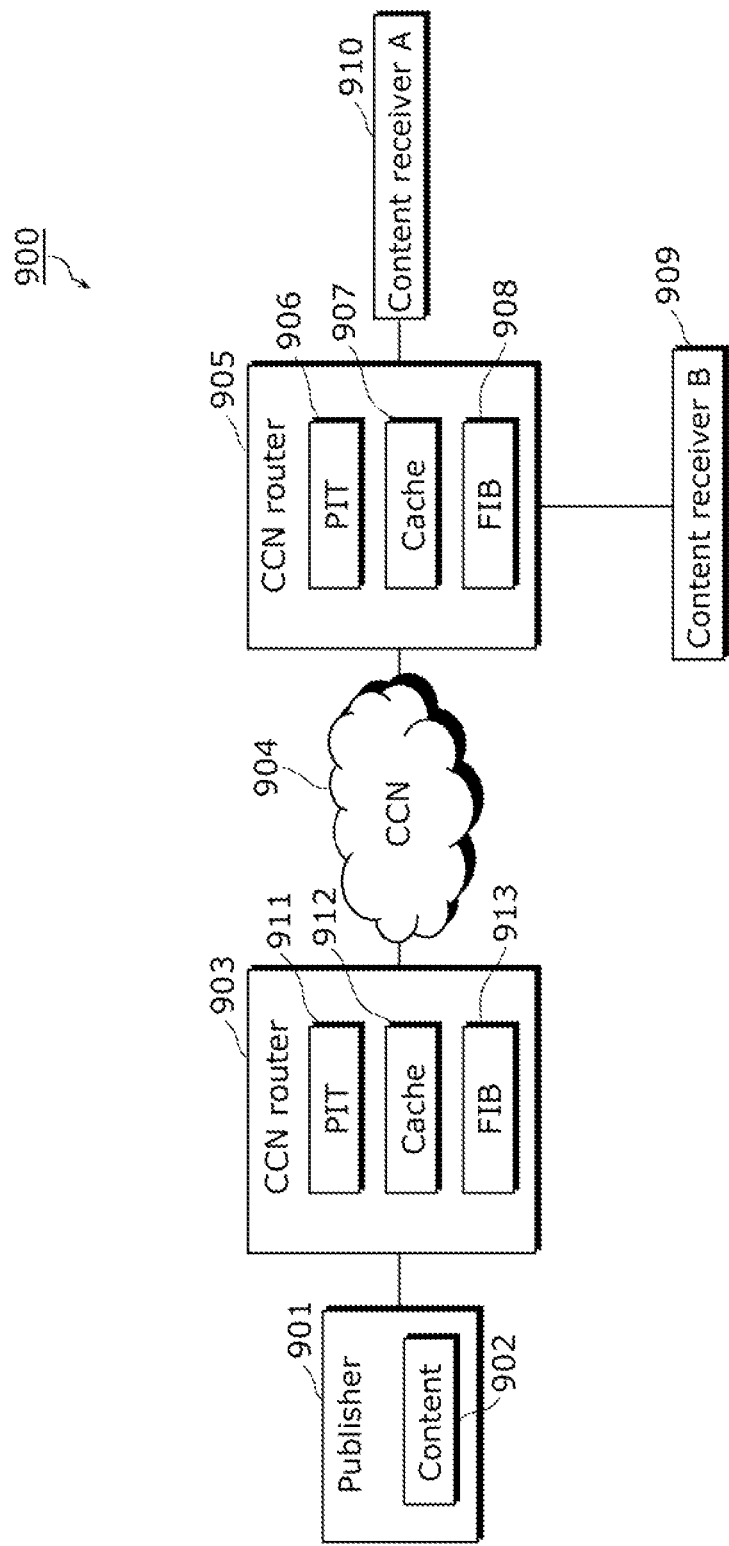
FIG. 1 is a diagram showing an exemplary content distribution system in a CCN.

FIG. 1 is a diagram showing an exemplary content distribution system in a CCN.

A content distribution system 900 shown in FIG. 1 includes a publisher 901, CCN routers 903 and 905, and a CCN 904.

The publisher 901 performs primary distribution of content and holds content 902.

The CCN routers 903 and 905 are 'exemplary CCN routers and connected via the CCN 904. The CCN router 903 includes a pending interest table (PIT) 911, a cache 912, and a forwarding information base (FIB) 913. The CCN router 905 includes a PIT 906, a cache 907, and an FIB 908. The cache 907 and the cache 912 temporarily store content data received. The PIT 906 and the PIT 911 record from which interface an interest packet is received and to which interface an interest packet is transmitted. The FIB 908 and the FIB 913 record to which interface an interest packet for data corresponding to each namespace is to be transmitted.

The CCN 904 includes at least one CCN router. As with the CCN routers 903 and 905, every CCN router includes a cache that temporarily stores content data received, a PIT that records from which interface an interest packet is received and to which interface an interest packet is transmitted, and an FIB that records to which interface an interest packet for data corresponding to each namespace is to be transmitted.

Each of a content receiver A 910 and a content receiver B 909 is, for instance, a content receiver using a PC or the like that is connected to the CCN 904 via the CCN router 905.

Next, a procedure will be described in which the content receiver A 910 receives the content 902 in the content distribution system 900 thus configured.

First, the content receiver A 910 transmits an interest packet having a namespace corresponding to the content 902, to the CCN router 905.

Next, when not holding, in the cache 907, content data corresponding to the namespace of the interest packet received from the content receiver A 910, the CCN router 905 forwards the interest packet to the CCN 904 according to information in the FIB 908.

It is to be noted that when holding, in the cache 907, the content data corresponding to the namespace of the interest packet, the CCN router 905 returns the content data to the content receiver A 910.

Next, a CCN router that has received the interest packet and is in the CCN 904 repeats the same operation as the CCN router 905.

Here, when the content 902 is not held in the CCN 904 including the CCN router 903, and only the publisher 901 holds the content 902, the interest packet issued by the content receiver A 910 reaches the publisher 901.

Subsequently, the publisher 901 that has received the interest packet returns, to the CCN router 903, the content data corresponding to the interest packet from the content receiver A 910.

Then, the CCN router 903 forwards content data (here the content 902) obtained for a corresponding interface, based on information described in the PIT 911 when the interest packet is forwarded to the publisher 901, and stores received data in the cache 912. After that, the content 902 is distributed to the content receiver A 910 by the CCN router in the CCN 904 and the CCN router 905 forwarding data according to information in the PIT.

Next, a procedure will be described in which the content receiver B 909 receives the content 902 after the content receiver A 910 received the content 902.

First, the content receiver B 909 issues an interest packet for the content 902 and transmits the interest packet to the CCN router 905.

Next, since the CCN router 905 holds, in the cache 907, content data corresponding to the interest packet issued by the content receiver B 909, the CCN router 905 returns the content data (the content 902) in response to the interest packet issued by the content receiver B 909.

In this manner, the content receiver B 909 is capable of obtaining the same content as the content receiver A 910 by using the content data held in the cache of the CCN router in the CCN 904. Besides, because the content data held in the cache of the CCN router can be used, traffic in the CCN is not increased. In other words, the traffic in the entire network at a time of content distribution can be decreased by using the CCN in which the content is held in the cache of the CCN router.

As stated above, the content distribution over the CCN is achieved by using the interest packet including the namespace when the content is obtained. For this reason, since a receiver that wants to receive content (hereinafter also referred to as a content receiver) is capable of specifying content with its namespace, the content receiver is capable of efficiently receiving the content without regard to a location where the content is stored Moreover, the CCN is a receiver-centric system in which a content receiver demands and obtains content. For this reason, a lot of people can efficiently receive content of a video site or the like without sacrificing its quality, using the CCN.

Like communications in the Internet, however, packet loss is likely to occur due to congestion or the like in the content distribution using the CCN. There is a possibility that the occurrence of the packet loss leads to reduced communication quality, e.g. it is not possible to receive complete content data.

For this problem, a method for addressing packet loss in a CCN using retransmission has been known (see NPLs 1 and 2, and Patent Literature (PTL) 1, for example).

NPL 1 discloses a method in which a receiver who demands content sets a valid time for an interest packet transmitted by the receiver, judges that packet loss has occurred when the content cannot be obtained after the valid time has passed, and retransmits the interest packet.

NPL 2 discloses a method for notifying a receiver of an occurrence of packet loss by returning a negative acknowledgment (NACK) packet when a router in a network was not able to obtain content in addition to when an interest packet times out, and retransmitting, by the notified receiver, the interest packet.

Furthermore, PTL 1 discloses a method in which a relay CCN router detects a packet including an error.

Therefore, using the retransmission control method disclosed in NPL 1 and NPL 2 makes it possible to (i) retransmit an interest packet for content data that a content receiver was not able to obtain when the content receiver was not able to obtain content due to an occurrence of packet loss in a CCN, and (ii) address the packet loss in the CCN.

However, even when the packet loss in the CCN is addressed using the retransmission method disclosed in NPL 1, NPL 2, PTL 1, and so on, a real-time property of obtaining content data cannot be ensured. Hereinafter, this problem will be described in detail.

When content distribution of which a real-time property is required such as live video distribution is performed in the CCN at a high level of quality, it is necessary to address packet loss occurring in the CCN in real time.

In contrast, the content distribution using the CCN is performed mainly by a content receiver. Accordingly, when packet loss occurs and an interest packet is retransmitted to obtain content again, the content receiver needs to detect the occurrence of the packet loss.

With the method disclosed in NPL 1, however, the content receiver needs to wait until an interest packet transmitted by the content receiver expires, to detect the occurrence of the packet loss. In other words, with the method disclosed in NPL 1, it takes a lot of time to detect the occurrence of the packet loss, and the real-time property of obtaining content data cannot be ensured.

Moreover, with the method disclosed in NPL 2, a content receiver is capable of detecting packet loss in less than or equal to a valid time of an interest packet by returning a NACK when a relay CCN router fails to obtain content data corresponding to the interest packet, in addition to the method disclosed in NPL 1. However, even when the method disclosed in NPL 2 is used, at least a round trip time (RTT) to a CCN router where packet loss has occurred is needed to detect the occurrence of the packet loss. To put it another way, when a publisher and the content receiver are away from each other, the real-time property of obtaining content data cannot be ensured.

Furthermore, with the method disclosed in PTL 1, although the relay CCN router is capable of detecting a packet including an error, a content receiver is not capable of detecting an occurrence of packet loss until the content receiver receives content data. Stated differently, with the method disclosed in PTL 1, it eventually takes the same length of time as NPL 1 to obtain content data that was not obtained due to packet loss, and the real-time property of obtaining content data cannot be ensured.

As stated above, it takes time to obtain the content even when the packet loss in the CCN is addressed using the retransmission method disclosed in NPL 1, NPL 2, and PTL 1, and a real-time property of obtaining content is lost. In other words, the real-time property of obtaining content data cannot be ensured. In contrast, in the case where retransmission control is not performed to place importance on the real-time property of obtaining content, content is not obtained even when the packet loss occurs, which leads to deterioration in the quality of the content.

Next, considerations for the publisher when real-time distribution is performed in the CCN will be described.

The real-time distribution over the CCN heavily depends on a processing capacity of the publisher. When content distribution is performed, the publisher is capable of placing content in a cache of the publisher by previously performing an encoding process or like on the content. Consequently, it is considered that a heavy load is not always put on the publisher in the content distribution.

However, when the content distribution is performed in real time, the publisher keeps receiving an interest packet for newest content that is issued by the content receiver. In this case, the publisher receiving the interest packet needs to continuously perform a process such as encoding within a limited amount of time, to achieve real-time content distribution.

In such a situation, when a task that requires a higher processing capacity than the processing capacity of the publisher is assigned to the publisher, transmission of the content data for the received interest packet stagnates. The content receiver undergoes a delay of a content obtainment time, and it is considered that a real-time property is reduced.

To put it another way, when the content distribution is performed in real time, putting a considerable load on the publisher causes a bottleneck for real-time distribution performed by the publisher.

NPL 1 assumes a mobile network as a means for connecting to a CCN. This means it is surely conceivable that a terminal of which a resource is limited such as a mobile terminal is a publisher in the CCN. When the publisher of which a resource is limited such as a mobile terminal performs content distribution in real time, there is a possibility that the processing required of the publisher easily exceeds a processing capacity of the publisher.

As stated above, putting an increased processing load other than content data transmission on the publisher prevents the content receiver from receiving (obtaining) content in real time.

Therefore, it is necessary to reduce the processing load put on the publisher as much as possible. Stated differently, the publisher needs to avoid performing processes other than content transmission as much as possible.

In order to solve such a problem, a server according to one aspect of the present invention is a server that processes a real-time stream transmitted via a content centric network (CCN), the server including: a CCN receiving unit configured to receive a packet from the CCN; a CCN transmitting unit configured to transmit a packet to the CCN; a converting unit configured to convert content data to enhance a real-time property, and create a packet of the converted content data; and a server control unit configured to update a routing table that describes processing for an interest packet, wherein the server control unit is configured to: when the CCN receiving unit receives an interest packet for content including converted content data, issue an interest packet for original content data of the content which is to be converted, and cause the CCN transmitting unit to transmit the issued interest packet; and when the CCN receiving unit receives from the CCN the original content data to be converted, cause the converting unit to convert the original content data and create a packet of the converted original content data, and cause the CCN transmitting unit to transmit the packet of the converted original content data as a response packet for the interest packet for the content including the converted content data.

With this aspect, it is possible to provide the server capable of ensuring a real-time property of obtaining content data.

In addition, not by a publisher but by the server of this aspect performing the conversion and distributing the converted content, it is possible to perform the content distribution of which the real-time property is required, at a high level of quality without increasing a load of the publisher in an environment where packet loss occurs in the CCN.

Here, for instance, the converting is FEC, the converting unit is configured to perform the FEC on the original content data to be converted, by adding redundant data to the original content data, and create a packet of the original content data on which the FEC is performed, and the server control unit is configured to: when the CCN receiving unit receives from the CCN an interest packet for content including original content data on which the FEC is performed, issue an interest packet for original content data of the content on which the FEC is to be performed; and when the CCN receiving unit receives from the CCN the original content data to be converted, cause the converting unit to perform the FEC on the original content data and create a packet of the original content data on which the FEC is performed.

With this configuration, it is possible to perform, for packet loss at a time of distributing content in the CCN, recovery processing using redundant data for content data in a forward error collection (FEC) system. As a result, it is possible to ensure a real-time property of obtaining content data while simultaneously achieving high-quality distribution.

Moreover, for example, the converting is transcoding, the converting unit is configured to perform the transcoding on the original content data to be converted, and create a packet of the original content data on which the transcoding is performed, and the server control unit is configured to: when the CCN receiving unit receives from the CCN an interest packet for content including content data on which the transcoding is performed, issue an interest packet for original content data of the content; and when the CCN receiving unit receives the original content data from the CCN, cause the converting unit to perform the transcoding on the original content data and create a packet of the original content data on which the transcoding is performed.

Furthermore, for instance, the server further includes a content cache that holds at least one of the original content data converted by the converting unit and the original content data received by the CCN receiving unit, wherein the content cache is used for the converting of the original content data or the response packet for the interest packet for the content including the converted content data.

Moreover, for example, the server further includes a server load monitoring unit configured to monitor a server load, wherein the server load monitoring unit is configured to create a route advertisement packet including at least load information indicating a server load, and transmit the route advertisement packet to the CCN via the CCN transmitting unit.

Furthermore, a router according to one aspect of the present invention is a router that transmits a real-time stream via a CCN, the router including: a CCN receiving unit configured to receive a packet from the CCN; a CCN transmitting unit configured to transmit a packet to the CCN; a converting unit configured to convert content data to enhance a real-time property, and create a packet of the converted content data; and a router control unit configured to update a routing table that describes processing for an interest packet, and create an interest packet for the converted content data or an interest packet for a redundant portion of the converted content data, wherein the router control unit is configured to: when the CCN receiving unit receives an interest packet for content including converted content data, issue an interest packet for original content data of the content which is to be converted, and cause the CCN transmitting unit to transmit the issued interest packet; and when the CCN receiving unit receives from the CCN the original content data to be converted, cause the converting unit to convert the original content data and create a packet of the converted original content data, and cause the CCN transmitting unit to transmit the packet of the converted original content data as a response packet for the interest packet for the content including the converted content data.

With this aspect, it is possible to provide the router capable of ensuring a real-time property of obtaining content data.

In addition, not by a publisher but by the router of this aspect performing the conversion and distributing the converted content, it is possible to perform the content distribution of which the real-time property is required, at a high level of quality without increasing a load of the publisher in an environment where packet loss occurs in the CCN.

Here, for instance, the converting is FEC, and the router control unit is configured to calculate necessary FEC strength from statistical information and create an interest packet for the content data on which the FEC is performed with the FEC strength or an interest packet for the redundant portion of the content data on which the FEC is performed with the FEC strength, the statistical information being calculated based on the real-time stream received by the CCN receiving unit, and including a packet loss rate, a round trip time (RTT) from when an interest packet is transmitted to when a packet is received, and packet receiving time information for reproducing the real-time stream.

Moreover, a receiving terminal according to one aspect of the present invention is a receiving terminal that obtains a real-time stream via a CCN, the receiving terminal including: a CCN receiving unit configured to receive a packet from the CCN; a terminal control unit configured to calculate necessary FEC strength based on the real-time stream received by the CCN receiving unit, and create an interest packet for content data on which FEC is performed with the FEC strength or an interest packet for a redundant portion of the content data on which the FEC is performed with the FEC strength; a CCN transmitting unit configured to transmit the interest packet created by the terminal control unit; and an FEC decoding unit configured to decode a packet of original content data on which the FEC is performed or the redundant portion, and provide recovery from packet loss of the original content data, the packet being a response packet for the interest packet transmitted by the CCN transmitting unit.

Here, for example, the terminal control unit is configured to calculate the necessary FEC strength from statistical information that is calculated based on the real-time stream received by the CCN receiving unit and includes a packet loss rate, an RTT from when an interest packet is transmitted to when a packet is received, and packet receiving time information for reproducing the real-time stream.

Furthermore, a processing method according to one aspect of the present invention is a processing method performed by a server that processes a real-time stream transmitted via a CCN, the processing method including: receiving a packet from the CCN; transmitting a packet to the CCN; converting content data to enhance a real-time property and creating a packet of the converted content data; and updating a routing table that describes processing for an interest packet, wherein the updating includes: when an interest packet for content including converted content data is received in the receiving, issuing an interest packet for original content data of the content which is to be converted, and transmitting the issued interest packet in the transmitting; and when the original content data to be converted is received from the CCN in the receiving, converting the original content data and creating a packet of the converted original content data in the converting and creating, and transmitting, in the transmitting, the packet of the converted original content data as a response packet for the interest packet for the content including the converted content data.

Moreover, a processing method according to one aspect of the present invention is a processing method performed by a router that transmits a real-time stream via a CCN, the processing method including: receiving a packet from the CCN; transmitting a packet to the CCN; converting content data to enhance a real-time property and creating a packet of the converted content data; and updating a routing table that describes processing for an interest packet, and creating an interest packet for the converted content data or an interest packet for a redundant portion of the converted content data, wherein the updating and creating includes: when an interest packet for content including converted content data is received in the receiving, issuing an interest packet for original content data of the content which is to be converted, and transmitting the issued interest packet in the transmitting; and when the original content data to be converted is received from the CCN in the receiving, converting the original content data and creating a packet of the converted original content data in the converting and creating, and transmitting, in the transmitting, the packet of the converted original content data as a response packet for the interest packet for the content including the converted content data.

Furthermore, a processing method according to one aspect of the present invention is a processing method performed by a receiving terminal that obtains a real-time stream via a CCN, the processing method including: receiving a packet from the CCN; calculating necessary FEC strength based on the real-time stream received in the receiving, and creating an interest packet for content data on which FEC is performed with the FEC strength or an interest packet for a redundant portion of the content data on which the FEC is performed with the FEC strength; transmitting the interest packet created in the calculating and creating; and decoding a packet of original content data on which the FEC is performed or the redundant portion, and providing recovery from packet loss of the original content data, the packet being a response packet for the interest packet transmitted in the transmitting.

Hereinafter, a server, a router, a receiving terminal, and a processing method according to one aspect of the present invention will be described in detail with reference to the drawings.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

(Embodiment 1)
[Configuration of Content Distribution System]

Figure 2:
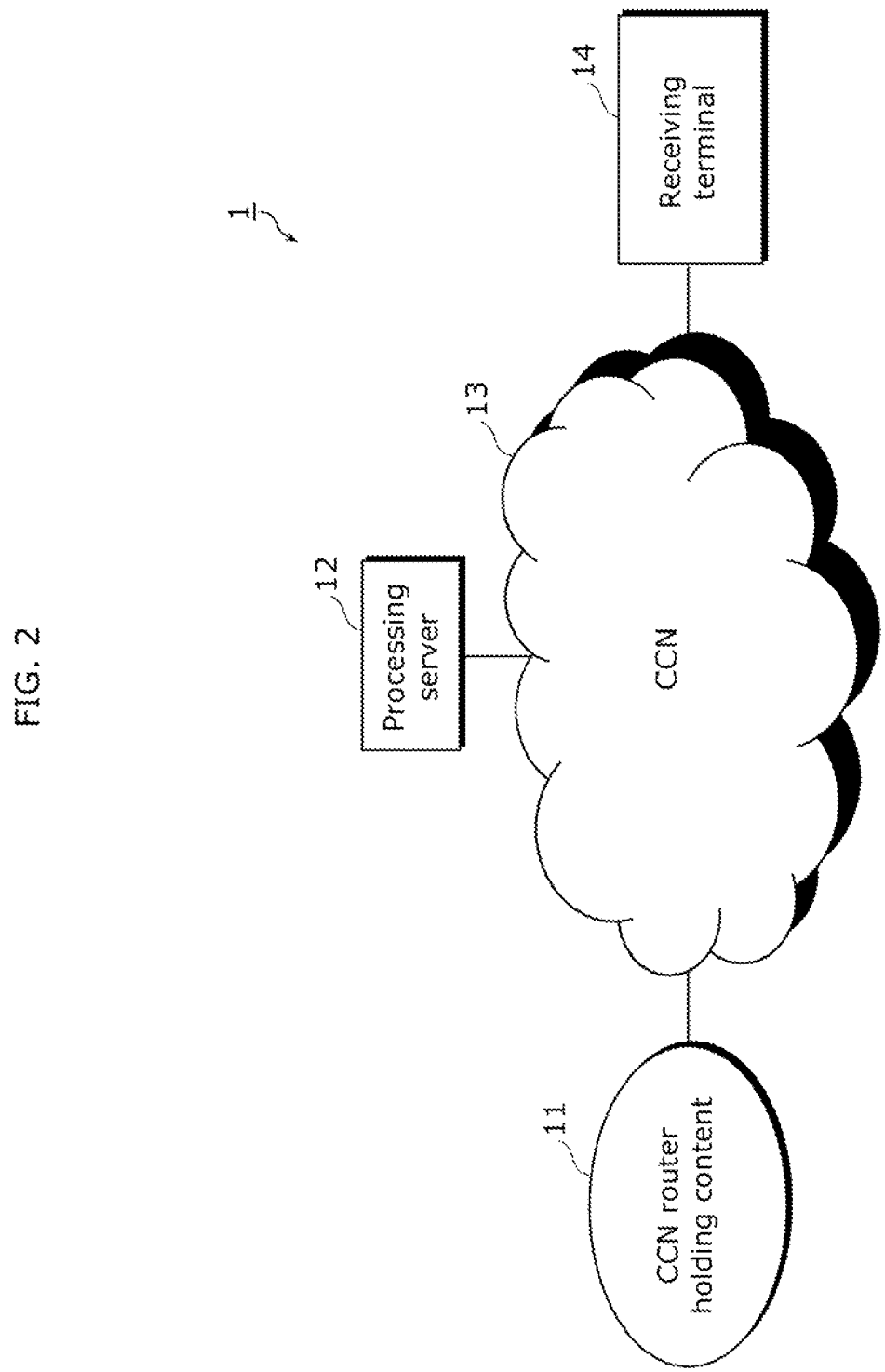
FIG. 2 is a diagram showing an exemplary configuration of a content distribution system in Embodiment 1.

FIG. 2 is a diagram showing an exemplary configuration of a content distribution system in Embodiment 1. A content distribution system 1 shown in FIG. 2 includes a CCN router 11 holding content, a processing server 12, and a receiving terminal 14, all of which are connected via a CCN 13.

When needing content converted to enhance a real-time property, the receiving terminal 14 issues an interest packet (hereinafter also referred to as post-conversion interest packet) for the content converted to enhance the real-time property. When needing data that is not converted, the receiving terminal 14 issues an interest packet for content data before conversion (hereinafter also referred to as original content).

When receiving an interest packet (post-conversion interest packet) for content that is converted to enhance a real-time property, the processing server 12 obtains, from the CCN 13 including the CCN router 11 holding content, original content corresponding to the post-conversion interest packet, converts the original content, and transmits the converted original content.

[Configuration of Processing Server]

Figure 3:
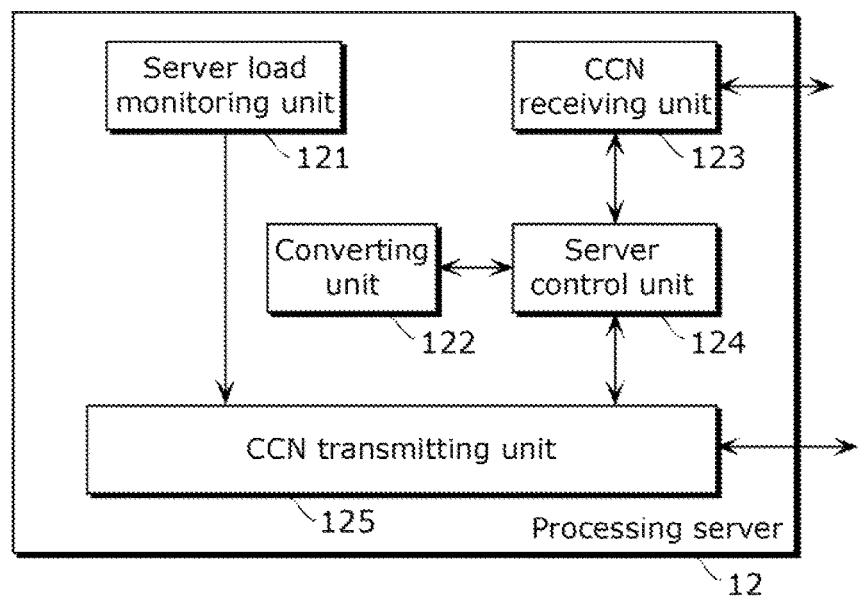
FIG. 3 is a diagram showing an exemplary detailed configuration of a processing server in Embodiment 1.

FIG. 3 is a diagram showing an exemplary detailed configuration of a processing server in Embodiment 1. The processing server 12 processes a real-time stream transmitted via the CCN 13. The processing server 12 includes a server load monitoring unit 121, a converting unit 122, a CCN receiving unit 123, a server control unit 124, and a CCN transmitting unit 125. The CCN receiving unit 123 and the CCN transmitting unit 125 are connected to the CCN 13.

The CCN receiving unit 123 receives a packet from the CCN 13. Moreover, the CCN receiving unit 123 receives data of original content that is content to be processed by the converting unit 122.

The CCN transmitting unit 125 transmits a packet to the CCN 13. Moreover, the CCN transmitting unit 125 transmits a packet of original content data converted by the converting unit 122.

The converting unit 122 converts content data to enhance a real-time property and creates a packet of the converted content data. More specifically, the converting unit 122 receives, from the server control unit 124, original content data of content that is received by the CCN receiving unit 123 and is to be converted, and converts the original content data to enhance the real-time property.

Here, the converting is FEC, for instance. In this case, the converting unit 122 creates a packet of original content data on which the FEC is performed by adding redundant data to the original content data to be processed. In other words, the converting unit 122 receives, from the server control unit 124, the original content received by the CCN receiving unit 123, and performs the FEC as the converting.

Moreover, the converting may be transcoding, for example. In this case, the converting unit 122 performs the transcoding on original content data to be processed and creates a packet of the original content data on which the transcoding is performed. To put it another way, the converting unit 122 receives, from the server control unit 124, the original content received by the CCN receiving unit 123, and performs the transcoding as the converting.

The server control unit 124 controls the converting unit 122, the CCN receiving unit 123, and the CCN transmitting unit 125 and issues an interest packet for original content in the CCN. Moreover, the server control unit 124 updates a routing table that describes processing for an interest packet.

Specifically, when the CCN receiving unit 123 receives an interest packet (post-conversion interest packet) for converted content, the server control unit 124 issues an interest packet for original content data of content to be converted and causes the CCN transmitting unit 125 to transmit the interest packet. When the CCN receiving unit 123 receives original content data to be processed from the CCN 13, the server control unit 124 causes the converting unit 122 to covert the original content data and create a packet of the converted original content data, and the CCN transmitting unit 125 to transmit the packet as a response packet for an interest packet (post-conversion interest packet) for the converted content.

Here, a case will be described where the converting is the FEC, for instance. When the CCN receiving unit 123 receives, from the CCN 13, an interest packet (post-conversion interest packet) for content on which the FEC is performed, the server control unit 124 issues an interest packet for original content data of content on which the FEC is to be performed. When the CCN receiving unit 123 receives original content data to be processed from the CCN 13, the server control unit 124 causes the converting unit 122 to perform the FEC on the original content data and create a packet of the original content data on which the FEC is performed.

Moreover, a case will be described where the converting is the transcoding, for example. When the CCN receiving unit 123 receives, from the CCN 13, an interest packet (post-conversion interest packet) for content on which the transcoding is performed, the server control unit 124 issues an interest packet for original content data of the content. When the CCN receiving unit 123 obtains original content data from the CCN 13, the server control unit 124 causes the converting unit 122 to perform the transcoding on the original content data and create a packet of the original content data on which the transcoding is performed.

Furthermore, the server control unit 124 has a routing table that records correspondence relationships between interest packets (post-conversion interest packets) for converted content and interest packets for original content. It is to be noted that the routing table will be described later, and thus a description thereof is omitted here.

It is to be noted that the server control unit 124 may include a content cache.

The server load monitoring unit 121 creates a route advertisement packet including at least load information indicating a server load, and transmits the route advertisement packet to the CCN 13 via the CCN transmitting unit 125.

The server load monitoring unit 121 has functions to calculate a remaining processing capacity of the processing server 12, issue a route advertisement packet, and transmit the route advertisement packet to the CCN transmitting unit 125. Detailed operation of the server load monitoring unit 121 will be described in Embodiment 5 below.

[Configuration of Receiving Terminal 14]

Next, a detailed configuration of the receiving terminal 14 will be described using FIG. 4.

Figure 4:
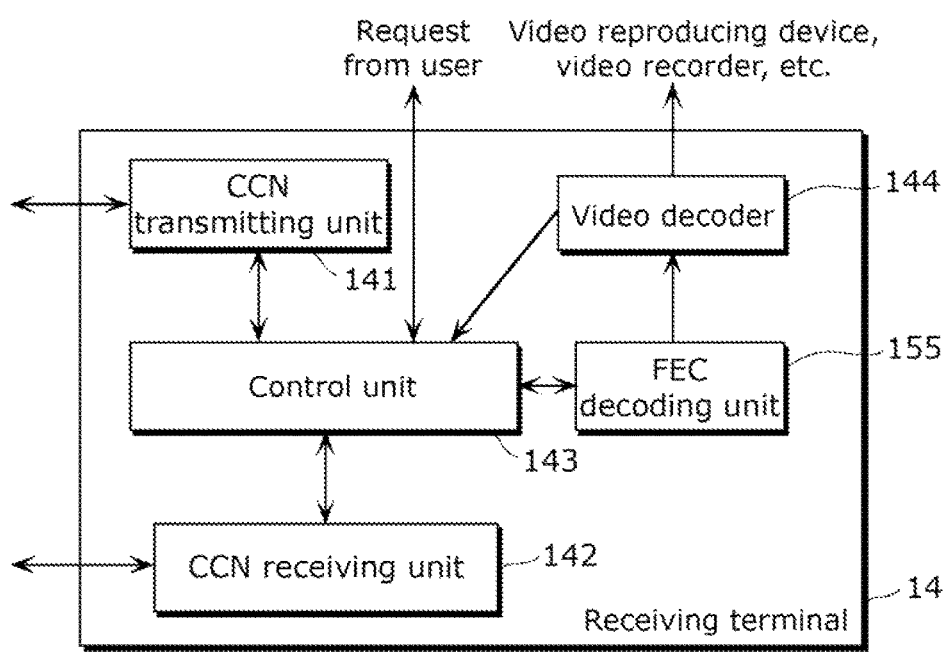
FIG. 4 is a diagram showing an exemplary detailed configuration of a receiving terminal in Embodiment 1.

FIG. 4 is a diagram showing an exemplary detailed configuration of a receiving terminal in Embodiment 1. The receiving terminal 14 shown in FIG. 14 obtains a real-time stream via the CCN 13.

The receiving terminal 14 shown in FIG. 4 includes a CCN transmitting unit 141, a CCN receiving unit 142, a control unit 143, a video decoder 144, and an FEC decoding unit 155.

The CCN transmitting unit 141 transmits an interest packet created by the control unit 143. The CCN receiving unit 142 receives a packet from the CCN 13. Moreover, as described in NPL 1, each of the CCN transmitting unit 141 and the CCN receiving unit 142 transmits and receives a packet corresponding to a namespace in the CCN, and is connected to the CCN 13.

The control unit 143 is an exemplary terminal control unit, and issues, when content converted to enhance a real-time property is necessary, an interest packet (post-conversion interest packet) for the content converted to enhance the real-time property. When data that is not converted is necessary, the control unit 143 issues an interest packet for original content before conversion.

Here, a case will be described where the converting is the FEC, for instance. In this case, the control unit 143 calculates a size of redundant data (hereinafter referred to as necessary FEC strength) necessary to recover lost packets, based on a real-time stream received by the CCN receiving unit 142, and creates an interest packet for content data on which the FEC is performed with the necessary FEC strength. The control unit 143 calculates the necessary FEC strength from statistical information that is calculated based on the real-time stream received by the CCN receiving unit 142 and includes a packet loss rate, a round trip time (RTT) from when an interest packet is transmitted to when a packet is obtained, and packet obtaining time information for reproducing the real-time stream. Stated differently, the control unit 143 issues an interest packet including calculated FEC strength and a bit rate and transmits the interest packet to the CCN transmitting unit 141, to obtain content data on which the FEC is performed (hereinafter also referred to as FEC content data). Moreover, the control unit 143 calculates an RTT from when an interest packet is issued to when a data packet is received.

As stated above, the control unit 143 receives the data received by the CCN receiving unit 142, and calculates first the packet loss rate and then the necessary FEC strength and the bit rate.

Here, the FEC strength will be described using FIG. 5A and FIG. 5B.

Figure 5A:
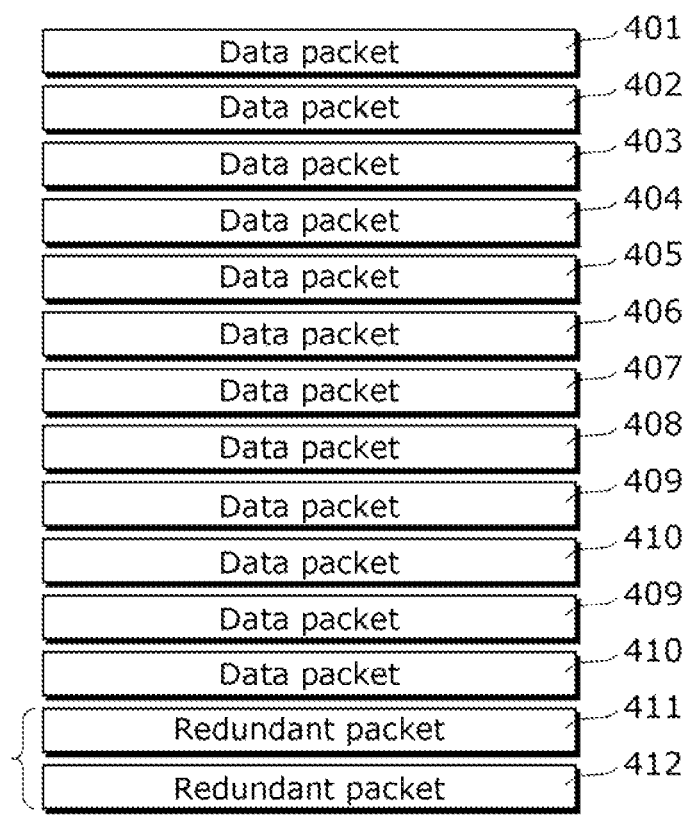
FIG. 5A is a diagram showing an exemplary packet structure of FEC content in Embodiment 1.
Figure 5B:
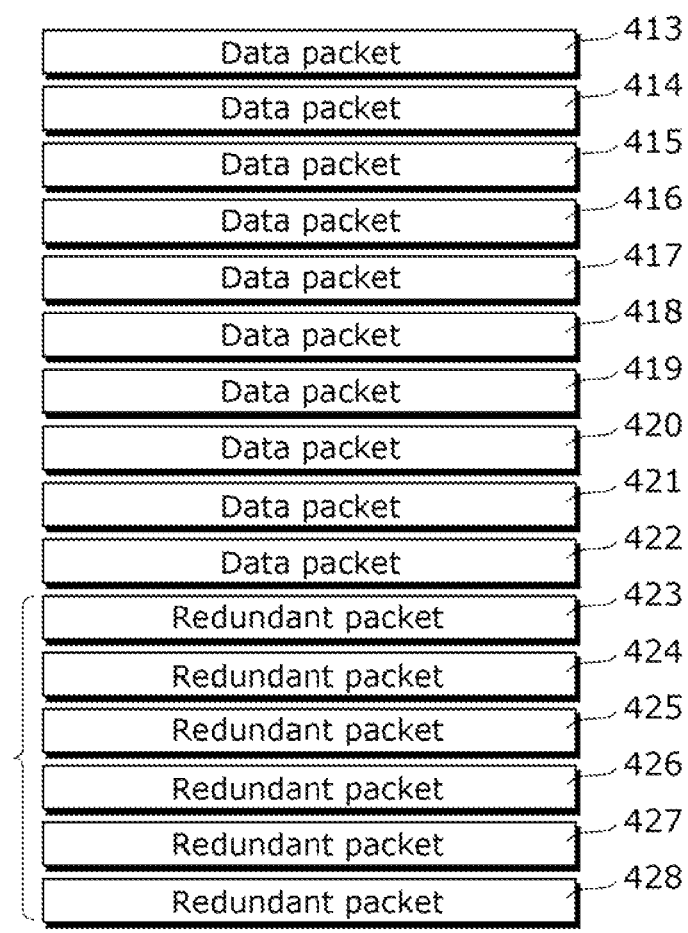
FIG. 5B is a diagram showing an exemplary packet structure of FEC content in Embodiment 1.

Each of FIG. 5A and FIG. 5B is a diagram showing an exemplary packet structure of FEC content in Embodiment 1.

FIG. 5A shows packets constituting FEC content A. The FEC content A includes data packets 401 to 410, and redundant packets 411 and 412 are added to the FEC content A. The redundant packets 411 and 412 in the FEC content A are created based on details of the data packets 401 to 410. Likewise, FIG. 5B shows packets constituting FEC content B. The FEC content B includes data packets 413 to 423, and redundant packets 423 to 428 are added to the FEC content B. The redundant packets 423 to 428 in the FEC content B are created based on details of the data packets 413 to 422.

Here, the two redundant packets are added for the ten data packets in the FEC content A. FEC strength in this case is referred to as 20% in the DESCRIPTION. Similarly, the six redundant packets are added for the ten data packets in the FEC content B. FEC strength in this case is referred to as 60%.

The FEC decoding unit 155 operates when the converting is the FEC, for instance. The FEC decoding unit 155 decodes a packet of original content data on which the FEC is performed, that is, a response packet for an interest packet transmitted by the CCN transmitting unit 141, and provides recovery from packet loss of the original content data. In other words, the FEC decoding unit 155 performs decoding of received FEC content data to original content data or recovery of lost packets when packet loss is detected.

Here, the erasure correction will be described using FIG. 5A and FIG. 5B.

Suppose that the receiving terminal 14 has received the FEC content A including the packets shown in FIG. 5A but has not successfully received two or less of the data packets because the two or less of the data packets are lost. In this case, the receiving terminal 14 is capable of reconstructing the lost data packets (lost packets) from the data packets and the redundant packets that have been successfully received thanks to the added redundancy. In this manner, the receiving terminal 14 is capable of obtaining the necessary data packets 401 to 410 regardless of the occurrence of the packet loss.

Likewise, when the receiving terminal 14 has received the FEC content B but six or less of the data packets have been lost (packet loss), the receiving terminal 14 is capable of recovering the data packets thanks to the redundant packets.

The video decoder 144 receives and decodes converted content, and transmits the decoded converted content to a video reproducing device, a video recorder, and so on. When the converting is the FEC, the video decoder 144 decodes converted content upon receiving a signal decoded by the FEC decoding unit 155, and transmits the decoded converted content to the video reproducing device, the video recorder, and so on. Moreover, the video decoder 144 transmits information of a received video stream to the control unit 143.

[Process Flow of Content Distribution System]

FIG. 6 is a sequential diagram showing a process flow of a content distribution system in Embodiment 1.

First, the receiving terminal 14 issues an interest packet (post-conversion interest packet) for content converted to enhance a real-time property (converted content) (S11).

Next, the CCN 13, that is, each CCN router in the CCN 13 determines whether the converted content corresponding to (requested by) the post-conversion interest packet issued in S11 is in the CCN 13 (S12). Here, the post-conversion interest packet is transferred in the CCN 13 based on an FIB of each CCN router.

In S12, when the converted content requested by the receiving terminal 14 is in the CCN 13 (Yes in S12), the converted content data is returned from the CCN 13 to the receiving terminal 14 (S14). Then, the receiving terminal 14 receives the converted content (S15).

On the other hand, in S12, when the converted content requested by the receiving terminal 14 is not in the CCN 13 (No in S12), the post-conversion interest packet reaches the processing server 12. The processing server 12 issues an interest packet for original content of the content which is to be converted, based on the post-conversion interest packet (S16). It is to be noted that S16 will be described in detail later, and thus a description thereof is omitted.

Next, the interest packet for the original content is transferred to the CCN router 11 holding the original content via the CCN 13. The CCN router 11 holding the original content returns a data packet of the original content in response to the received interest packet (S17).

Next, the returned data packet of the original content is transferred to the processing server 12 via the CCN 13. The processing server 12 converts the received original content (S18) to generate converted content data.

Next, the processing server 12 returns the converted content data according to information in a PIT, in response to the post-conversion interest packet (S19). It is to be noted that S18 and S19 will be described in detail later, and thus a description thereof is omitted.

Next, the receiving terminal 14 receives the converted content data returned in S19 via the CCN 13 (S15).

With the above-described process flow of the content distribution system, the receiving terminal 14 is capable of obtaining the converted content data.

[Process Flow Through which Receiving Terminal 14 Issues Post-Conversion Interest Packet]

Next, a process flow through which the receiving terminal 14 issues a post-conversion interest packet will be described using FIG. 7. Hereinafter, as an example, a case will be described where the FEC is performed as the converting.

FIG. 7 is a diagram showing a process flow through which a receiving terminal issues an interest packet in Embodiment 1.

First, the control unit 143 starts upon receiving packets (packet arrival) or in response to a request from a user (S111, S119). The following first describes a case where the control unit 143 starts upon packet arrival. Here, the packet arrival at the control unit 143 means that the CCN receiving unit 142 receives packets and notifies the control unit 143 of the reception of the packets, and the control unit 143 starts (S111).

Next, the CCN receiving unit 142 transmits received data such as content data to the control unit 143 (S112).

Next, the control unit 143 detects packet loss by monitoring, for instance, a gap between sequence numbers of transmitted content data items, and calculates FEC strength necessary to recover lost packets from statistical information such as a rate of the occurrence of packet loss (S113).

Next, the control unit 143 determines whether it is necessary to issue an interest packet for subsequent content (next content) of the content included in the received data (S114). When the control unit 143 determines that it is unnecessary to issue the interest packet for the next content in S114 (No in S114), the processing is terminated.

In contrast, when the control unit 143 determines that it is necessary to issue the interest packet for the next content in S114 (Yes in S114), the control unit 143 determines whether it is necessary to perform the FEC on content for which an interest packet is issued next (S115).

For instance, when a packet of content data is a packet of time-shared video content, and the packet of this video content is obtained and the video is reproduced, it is necessary to sequentially obtain the packet within a given length of time to achieve real-time reproduction. In this case, the control unit 143 determines whether it is necessary to perform the FEC on the content for which the interest packet is issued next, based on statistical information such as a packet loss rate (rate of the occurrence of packet loss) of the transmitted content data and a RTT. It is to be noted that statistical information such as a packet loss rate of previously obtained FEC content data and a RTT may be used for the determination in S115.

When the control unit 143 determines that it is necessary to perform the FEC on the content for which the interest packet is issued next in S115 (Yes in S115), the control unit 143 issues an FEC interest packet for requesting FEC content data obtained by performing the FEC on original content with the necessary FEC strength (S116). Here, the control unit 143 issues the FEC interest packet in which a time stamp at a packet issuance time or a time limit for obtaining content is included in addition to the FEC strength. Including the time stamp in the FEC interest packet makes it possible to use the time stamp for measuring a RTT from when the FEC interest packet is issued to when content is received. In this embodiment, the control unit 143 issues, as an FEC interest packet, an interest packet for a namespace having a prefix of FEC service to be described later.

In contrast, when the control unit 143 determines that it is unnecessary to perform the FEC on the content for which the interest packet is issued next in S115 (No in S115), the control unit 143 issues an FEC interest packet for requesting normal data, that is, content data on which the FEC is not performed (S117). It is to be noted that the control unit 143 also includes a time stamp at a packet issuance time in this interest packet. Including the time stamp in the interest packet makes it possible to use the time stamp for measuring a RU from when the interest packet is issued to when content is received.

Next, the CCN transmitting unit 141 transmits the FEC interest packet or the interest packet created by the control unit 143 to the CCN 13 (S118).

It is to be noted that when the control unit 143 starts in response to the request from the user (S119), the control unit 143 advances to the process in S115 immediately after the start. The subsequent processes are as described above, and thus a description thereof is omitted.

[Exemplary Structure of Interest Packet]

Next, exemplary structures of an interest packet and a post-conversion interest packet created by the receiving terminal 14 or the like will be described using the figures. Hereinafter, as an example, the case will be also described where the FEC is performed as the converting.

Figure 8A:
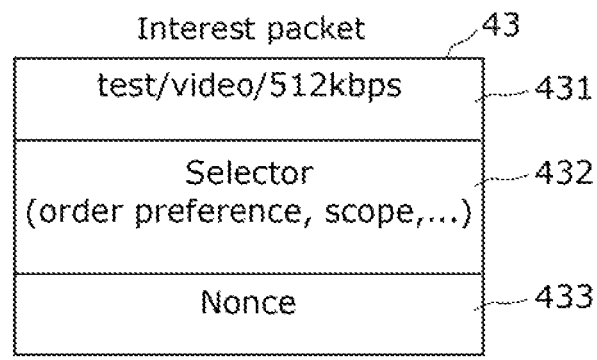
FIG. 8A is a diagram showing an exemplary structure of an interest packet in CCN.

FIG. 8A is a diagram showing an exemplary structure of an interest packet in CCN. Each of FIG. 8B to FIG. 8E is a diagram showing an exemplary structure of an FEC interest packet in Embodiment 1.

A structure of an interest packet 43 shown in FIG. 8A is described in above-mentioned NPL 1, and is an exemplary structure of a common interest packet used in the CCN 13.

The interest packet 43 includes fields 431 to 433.

The field 431 is a field into which a namespace corresponding to content requested by a content receiver is inputted. For instance, when the content receiver requests data corresponding to the namespace "test/video/" at the bit rate "512kbps," the namespace "test/video/512kbps" is inputted into the field 431, and the above data can be specified with this namespace.

The field 432 is a field in which a scope of an interest packet or other information is entered.

Moreover, the field 433 is a field into which a receiver (content receiver) inputs a random number to ensure uniqueness of an interest packet. As described in NPL 1, when each CCN router included in the CCN 13 receives an interest packet, the field 433 into which the random number is inputted is used to determine whether the CCN router has previously received an interest packet transmitted at the same time by the same content receiver.

The FEC interest packets shown in FIG. 8B to FIG. 8E will be described assuming, as an example, that a content receiver transmits an FEC interest packet having the namespace "test/video/512kbps".

Figure 8B:
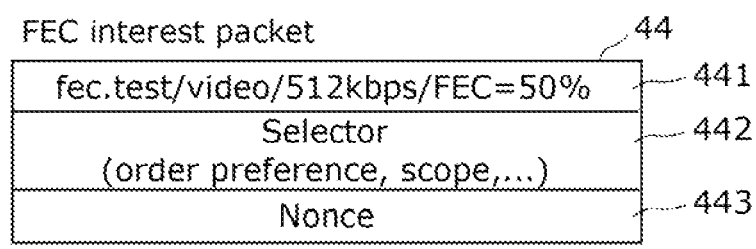
FIG. 8B is a diagram showing an exemplary structure of an FEC interest packet in Embodiment 1.
Figure 8C:
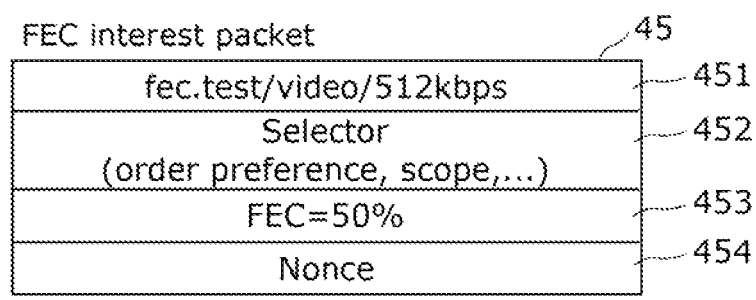
FIG. 8C is a diagram showing an exemplary structure of an FEC interest packet in Embodiment 1.
Figure 8D:
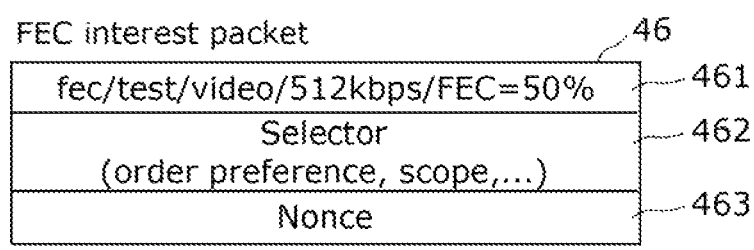
FIG. 8D is a diagram showing an exemplary structure of an FEC interest packet in Embodiment 1.
Figure 8E:
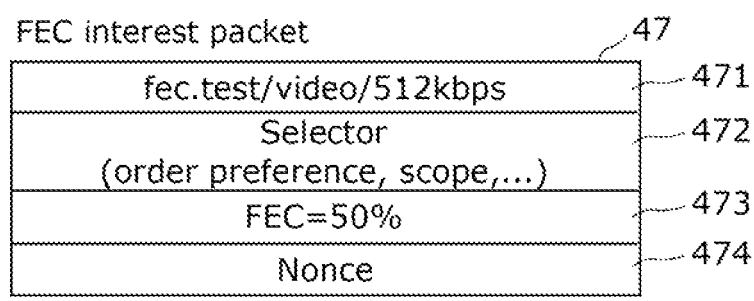
FIG. 8E is a diagram showing an exemplary structure of an FEC interest packet in Embodiment 1.

Each of an FEC interest packet 44 shown in FIG. 8B, an FEC interest packet 45 shown in FIG. 8C, an FEC interest packet 46 shown in FIG. 8D, and an FEC interest packet 47 shown in FIG. 8E is an exemplary FEC interest packet for requesting content data obtained by adding redundant data with FEC strength of 50% to content having the namespace "test/video/512kbps".

Each of a filed 441 shown in FIG. 8B, a field 451 shown in FIG. 8C, a field 461 shown in FIG. 8D, and a field 471 shown in FIG. 8E is a field into which a namespace corresponding to FEC content requested by the content receiver is inputted.

Moreover, each of a field 442 shown in FIG. 8B, a field 452 shown in FIG. 8C, a field 462 shown in FIG. 8D, and a field 472 shown in FIG. 8E is a field in which a scope of the FEC interest packet or other information is entered.

Furthermore, each of a field 443 shown in FIG. 8B, a field 454 shown in FIG. 8C, a field 463 shown in FIG. 8D, and a field 474 shown in FIG. 8E is a field into which a receiver (content receiver) inputs a random number to ensure uniqueness of the FEC interest packet.

More specifically, a case is shown where in the FEC interest packet 44 and the FEC interest packet 45, a service for performing the FEC provided by the processing server 12 has the prefix "fec." of a namespace in the CCN 13. A case is shown where in the FEC interest packet 46 and the FEC interest packet 47, a service for performing the FEC provided by the processing server 12 has the prefix "fec/" of a namespace in the CCN 13.

Moreover, as shown in the field 441 shown in FIG. 8B and the field 461 shown in FIG. 8D, the FEC strength may be specified together with the namespace for requesting the FEC interest packet. Furthermore, as shown in the field 453 shown in FIG. 8C and the field 473 shown in FIG. 8E, an extension header (extension field) for describing FEC strength may be defined, and the FEC strength may be described in the extension header.

It is to be noted that when the receiving terminal 14 issues the FEC interest packet 44 and the FEC interest packet 45, the processing server 12 in the CCN 13 corresponds to the namespace "fec.". Likewise, when the receiving terminal 14 issues the FEC interest packet 46 and the FEC interest packet 47, the processing server 12 corresponds to the namespace "fec/".

[Process Flow Until Processing Server 12 Transmits Converted Content Data]

Next, a process flow from when the processing server 12 receives a post-conversion interest packet to when the processing server 12 transmits converted content data corresponding to the post-conversion interest packet will be described using FIG. 9. It is to be noted that this processing corresponds to detailed S16, S18, and S19 shown in FIG. 6. Hereinafter, as an example, a case will be described where the FEC is performed as the converting.

Figure 9:
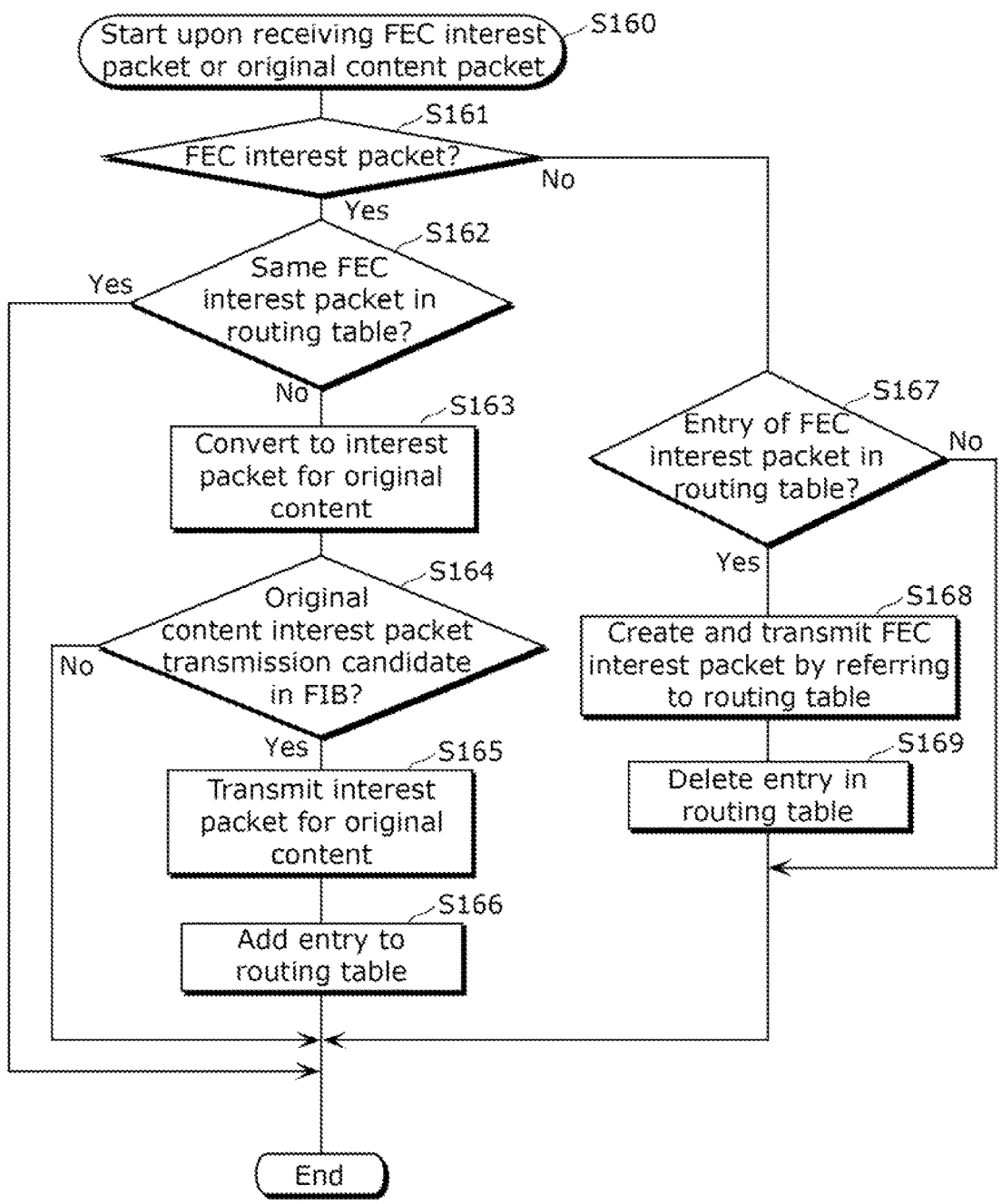
FIG. 9 is a diagram showing a process flow until a processing server transmits converted content data in Embodiment 1.

FIG. 9 is a diagram showing a process flow until a processing server transmits converted content data in Embodiment 1.

First, the processing server 12 starts upon receiving an FEC interest packet or an original content packet (S160), and determines whether what is received is an FEC interest packet (S161).

When the processing server 12 determines that what is received by the processing server 12 is the FEC interest packet in S161 (Yes in S161), the processing server 12 determines whether the processing server 12 has previously received the same FEC interest packet as the FEC interest packet (S162). In this embodiment, the processing server 12 determines whether the processing server 12 has previously received the same FEC interest packet as the FEC interest packet, by determining whether the same FEC interest packet is in a routing table.

When the processing server 12 determines that the same FEC interest packet is in the routing table in S162 (Yes in S162), the processing server 12 terminates the processing and discards the received FEC interest packet.

In contrast, when the processing server 12 does not determine that the same FEC interest packet is in the routing table in S162 (No in S162), that is, the processing server 12 determines that the received FEC interest packet is different from the previously received FEC interest packet, the processing server 12 converts the received FEC interest packet into an interest packet for original content (S163). It is to be noted that the conversion procedure will be described later, and thus a description thereof is omitted.

Next, the processing server 12 determines whether a transmission destination candidate of the interest packet for the original content converted in S163 is in an FIB (S164).

When the processing server 12 determines that the transmission destination candidate of the interest packet for the original content is not in the FIB in S164 (No in S164), the processing server 12 terminates the processing.

In contrast, when the processing server 12 determines that the transmission destination candidate of the interest packet for the original content is in the FIB in S164 (Yes in S164), the processing server 12 causes the CCN transmitting unit 125 to transmit the interest packet for the original content (S165).

Next, the processing server 12 adds an entry to the routing table (S166). More specifically, the processing server 12 adds the entry including the received FEC interest packet, an FEC interest packet for original content on which the FEC is performed, and information on a face that transmits the interest packet for the original content. It is to be noted that a structure of the routing table will be described in detail later.

Subsequently, a case will be described where in S160 the processing server 12 receives an original content packet as a response to the interest packet for the original content data transmitted in S165, for instance.

In this case, the processing server 12 determines that what is received by the processing server 12 is not the FEC interest packet in following S161 (No in S161), and determines whether the received original content packet and a corresponding interest packet are in an entry in the routing table (S167).

When the processing server 12 determines that the received original content packet and the corresponding interest packet are not in the entry in the routing table in S167 (No in S167), the processing server 12 terminates the processing.

In contrast, when the processing server 12 determines that the received original content packet and the corresponding interest packet are in the entry in the routing table in S167 (Yes in S167), the processing server 12 creates and transmits an FEC interest packet while comparing correspondence relationships between FEC interest packets and interest packets for original content in the routing table (S168). Here, the processing server 12 causes the converting unit 122 to perform the FEC. Moreover, the processing server 12 causes the CCN transmitting unit 125 to transmit the created FEC interest packet.

Next, the processing server 12 deletes the entry in the routing table (S169). More specifically, since the FEC ended, the processing server 12 deletes the entry in the routing table in which the FEC interest packet corresponding to the FEC content transmitted in S168 is contained.

Finally, the processing server 12 terminates the processing after S169.

It is to be noted that the FEC content packet transmitted in S168 is transferred to the CCN receiving unit 142 of the receiving terminal 14 by referring to a PIT of a relay CCN router included in the CCN 13. The control unit 143 receives the FEC content packet received by the CCN receiving unit 142, and determines whether the received FEC content packet is an FEC content packet. When the control unit 143 determines that the received packet is the FEC content packet, the FEC decoding unit 155 decodes the packet. In the case where packet loss occurs when the FEC decoding unit 155 decodes the packet, the FEC decoding unit 155 performs erasure correction. The video decoder 144 receives the original content data decoded by the FEC decoding unit 155, and transmits the original content data to the external video reproduction device, the video recorder, or the like.

[Exemplary Structure of Routing Table 51]

Next, an exemplary structure of a routing table that describes processing for an interest packet will be described.

FIG. 10 is a diagram showing an exemplary structure of a routing table in Embodiment 1.

A routing table 51 shown in FIG. 10 includes FEC interest packet information 511, original content interest packet information 512, incoming face information 513, and outgoing face information 514, and is used to manage interest packets.

The FEC interest packet information 511 contains information on an FEC interest packet received by the processing server 12, and the incoming face information 513 contains information on a face that has received an interest packet. The original content interest packet information 512 contains information on an original content interest packet converted from an FEC interest packet, and the outgoing face information 514 contains information on a face that has transmitted an original content interest packet.

For example, when the processing server 12 receives the FEC interest packet "/fec/test/video/512kbps/FEC=50%", the information is contained in a field of the FEC interest packet information 511. When an interface or an application (hereinafter also referred to as incoming face) with which the processing server 12 has received the FEC interest packet has the number "0," "0" is written (entered) into a field of the incoming face information 513. When an original content interest packet converted from an FEC interest packet is "/test/video/512kbps", "/test/video/512kbps" is written into a field of the original content interest packet information 512. Moreover, when interfaces or applications (hereinafter also referred to as outgoing faces) with which the processing server 12 has transmitted an original content interest packet has the numbers "2, 4", "2, 4" is written into a field of the outgoing face information 514.

It is to be noted that information contained in the routing table 51 is not limited to the above-mentioned four exemplary types. For instance, information on a random number assigned to each interest packet described in above-mentioned NPL 1 may be also entered in the routing table 51. In addition, a time-out period of each interest packet may be also entered in the routing table 51.

Moreover, a format of the routing table 51 is not limited to the above-described table, but may be achieved by extending the PIT described in NPL 1, for example.

19

[Exemplary Structure of Original Content Interest Packet]

Next, an exemplary structure of an interest packet for original content created in the processing server 12 will be described.

Figure 11:
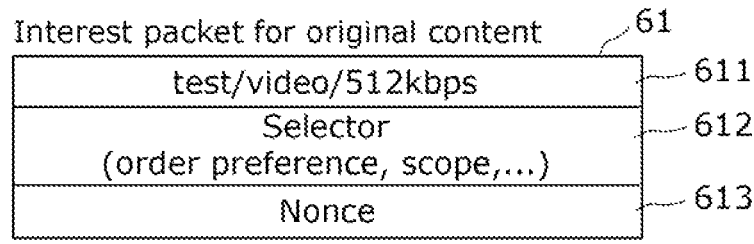
FIG. 11 is a diagram showing an exemplary structure of an interest packet for original content created in a processing server in Embodiment 1.

FIG. 11 is a diagram showing an exemplary structure of an interest packet for original content created in the processing server 12 in Embodiment 1.

An interest packet 61 shown in FIG. 11 includes fields 611 to 613.

The field 611 is a field into which a namespace of original content corresponding to FEC content requested by a content receiver is inputted. The field 612 is a field into which additional information at a time of obtaining content such as a scope of an interest packet for original content is inputted. The field 613 is a field into which a receiver (processing server) inputs a random number to ensure uniqueness of original content.

FIG. 11 shows a case where the processing server 12 converts an FEC interest packet for content having the namespace "test/video/512kbps" shown in FIG. 8A to FIG. 8E, into an interest packet for original content. For instance, the processing server 12 inputs, into the field 611, the namespace "test/video/512kbps" of original content corresponding to FEC content specified with any one of the FEC interest packets shown in FIG. 8A to FIG. 8E.

[Effect]

As described above, according to this embodiment, it is possible to provide the content distribution system, the server, the receiving terminal, and the processing method that make it possible to ensure the real-time property of obtaining content data.

Moreover, it is possible to perform, by using the server in this embodiment, the content distribution of which the real-time property is required, at a high level of quality without increasing the load of the publisher in an environment where packet loss occurs in the CCN.

It is to be noted that when the CCN routers in the CCN are capable of detecting packet loss, each of the CCN routers may perform erasure correction using the FEC.

Moreover, the CCN router holding content may serve the same role as the processing server.

Furthermore, although the original content is described as the video data in this embodiment, the original content is not limited to the video data. The original content may be audio data or image data as long as such data is data of which a real-time property is required.

Moreover, the structure of the FEC interest packet is not limited to the examples shown in FIG. 8B to FIG. 8E. Each of FIG. 12A and FIG. 12B is a diagram showing another exemplary structure of an FEC interest packet in Embodiment 1.

Figure 12A:
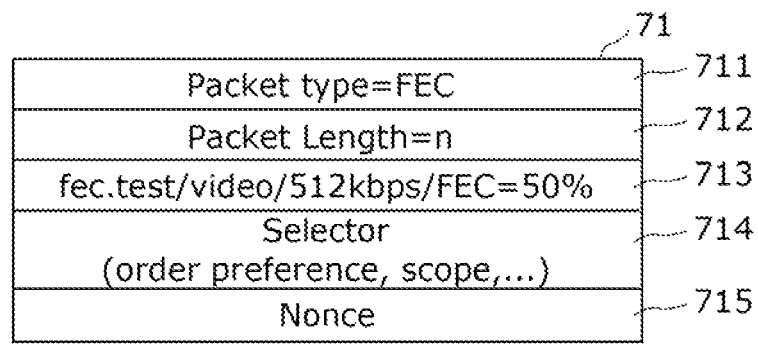
FIG. 12A is a diagram showing another exemplary structure of an FEC interest packet in Embodiment 1.

As shown in FIG. 12A, for instance, the FEC interest packet may be an FEC interest packet 71 including fields of Type, Length (length), and Value (value) and having a type-length-value (TLV) format. In this case, information indicating that the FEC has been performed is entered as Type of the FEC interest packet 71 in a field 711, and Length (length) of the FEC interest packet 71 is entered in a field 712. Fields 713 to 715 are the same as the fields 441 to 443 shown in FIG. 8B, and thus a description thereof is omitted.

Figure 12B:
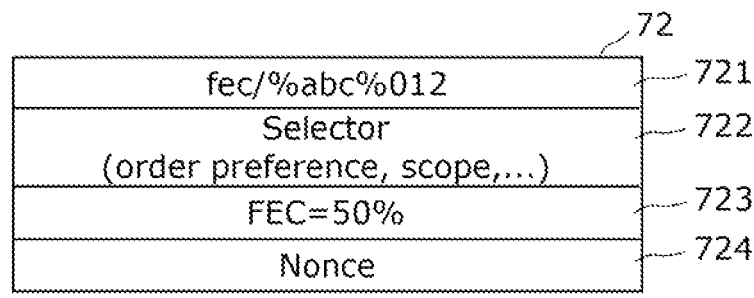
FIG. 12B is a diagram showing still another exemplary structure of an FEC interest packet in Embodiment 1.

Moreover, as shown in FIG. 12B, the FEC interest packet may be an FEC interest packet 72 in which part of a namespace is converted so that a third person cannot read the part of the namespace. In this case, part of the namespace corresponding to FEC content requested by a content receiver is converted using hush or the like to prevent a third person from reading the part of the namespace in a field 721.

20

FIG. 12B shows an example where "fec.test/video/512kbps" entered in the field 451 in FIG. 8C or "fec/test/video/512kbps" entered in the field 471 in FIG. 8E is converted into "fec/%abc%012". It is to be noted that fields 722 to 724 are the same as the fields 452 to 454 shown in FIG. 8C or the fields 472 to 474 shown in FIG. 8D, and thus a description thereof is omitted.

(Embodiment 2)

In the content distribution system in Embodiment 1, the receiving terminal issues the post-conversion interest packet and receives the converted content data. Specifically, in Embodiment 1, since the FEC content (content including original content and redundant data due to FEC) corresponds to the prefix "fec." or "fec/" of the namespace, the receiving terminal issues only the FEC interest packet and receives the FEC content data.

However, redundant data included in FEC content may hold original content and an independent namespace. In this case, when the prefix "fec." or "fec/" of the namespace indicates only the redundant data of the FEC content, the receiving terminal is capable of separately obtaining the original content and the redundant data from the CCN by separately issuing an interest packet for the redundant data and an interest packet for the original content.

Thus, in Embodiment 2, a case will be described where, assuming that the converting is the FEC, a receiving terminal issues not a post-FEC interest packet but an interest packet for redundant data due to FEC and an interest packet for original content.

[Process Flow of Content Distribution System]

Figure 13:
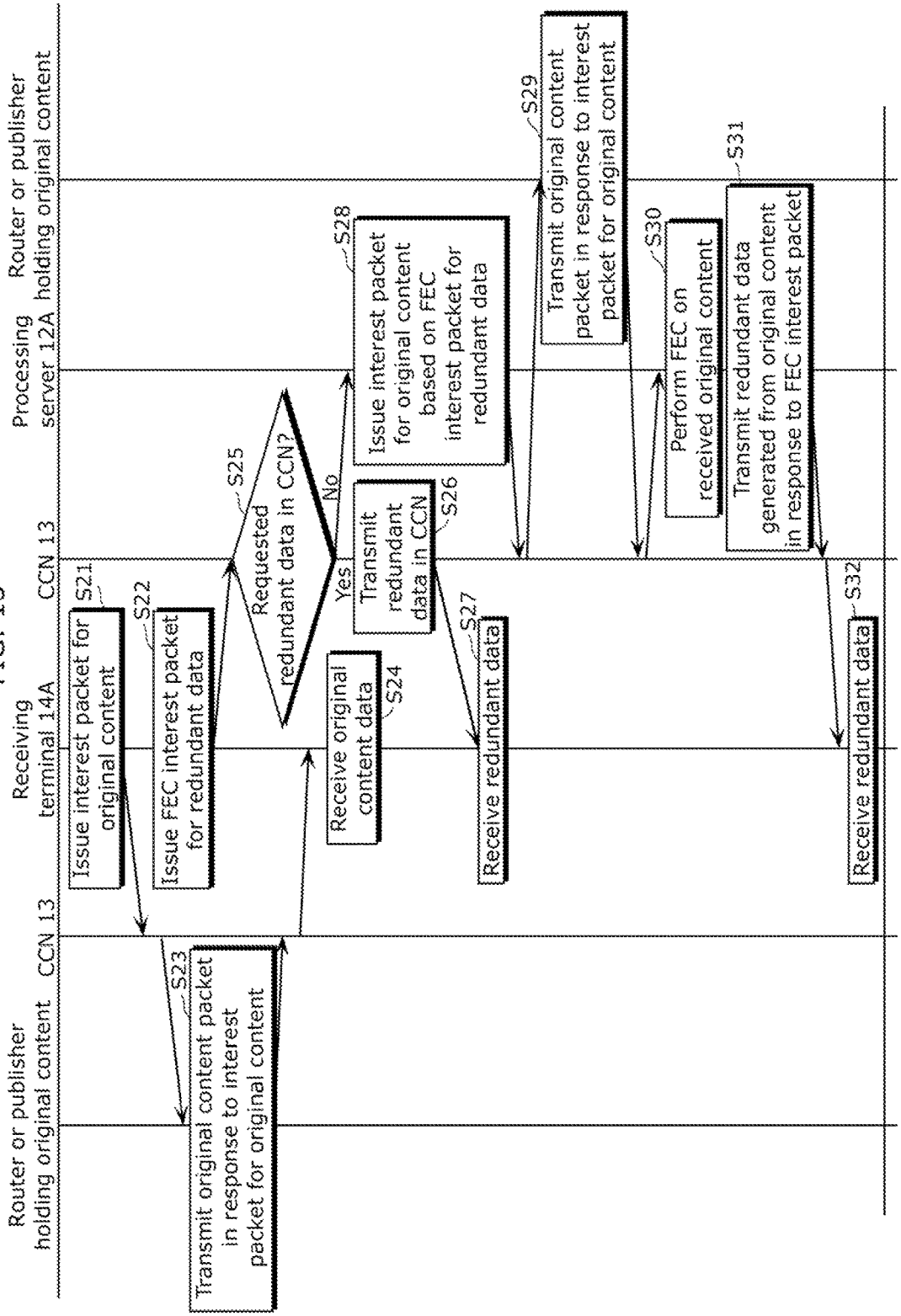
FIG. 13 is a sequential diagram showing a process flow of a content distribution system in Embodiment 2.

FIG. 13 is a sequential diagram showing a process flow of a content distribution system in Embodiment 2. FIG. 13 shows the process flow of the content distribution system when a receiving terminal 14A separately receives redundant data and original content. It is to be noted that the receiving terminal 14A and a processing server 12A in this embodiment are the same as the receiving terminal 14 and the processing server 12 in Embodiment 1 except for a process for an interest packet (FEC interest packet) for redundant data due to FEC and a process for an interest packet for original content.

First, the receiving terminal 14A issues an interest packet for original content (S21), and issues an FEC interest packet for redundant data (S22). It is to be noted that either one of S21 and S22 may be performed first.

Next, the interest packet for the original content issued in S21 is transmitted to the CCN 13, and reaches a router holding the original content or a publisher via the CCN 13. This router or publisher returns a packet of original content data in response to the interest packet for the original content (S23).

Next, the receiving terminal 14A receives the packet of the original content data returned via the CCN 13 (S24), and obtains the original content data.

In contrast, the CCN 13, that is, each CCN router in the CCN 13 determines whether the redundant data corresponding to (requested by) the interest packet issued in S22 is in the CCN 13 (S25). Here, the FEC interest packet issued in S22 is transmitted to the CCN 13 and transferred in the CCN 13 based on an FIB of each CCN router.

When the redundant data requested by the receiving terminal 14A is in the CCN 13 in S25 (Yes in S25), the redundant data is returned from the CCN 13 to the receiving terminal 14A (S26). Then, the receiving terminal 14A receives the redundant data (S27).

In contrast, when the redundant data requested by the receiving terminal 14A is not in the CCN 13 in S25 (No in S25), the FEC interest packet for the redundant data reaches the processing server 12A. The processing server 12A issues an interest packet for the original content based on the FEC interest packet for the redundant data (S28).

Next, the interest packet for the original content issued in S28 reaches the router holding the original content or the publisher, and the router or the publisher returns a data packet of the original content in response to the received interest packet (S29).

Next, the returned data packet of the original content is transferred to the processing server 12A via the CCN 13. The processing server 12A performs the FEC on the received original content (S30) to generate its redundant data.

Next, the processing server 12A returns the redundant data according to information in a PIT, in response to the FEC interest packet for the redundant data (P31).

Next, a packet of the redundant data transmitted from the processing server 12A in S31 is received by the receiving terminal 14A via the CCN 13 (S32).

With the process flow of the content distribution system as described above, the original content and the redundant data are in different respective CCN routers, and thus the receiving terminal 14A is capable of efficiently obtaining the FEC content.

[Process Flow Through which Receiving Terminal 14A Issues Interest Packet and FEC Interest Packet]

Next, a process flow through which the receiving terminal 14A issues an interest packet and an FEC interest packet will be described using FIG. 14.

Figure 14:
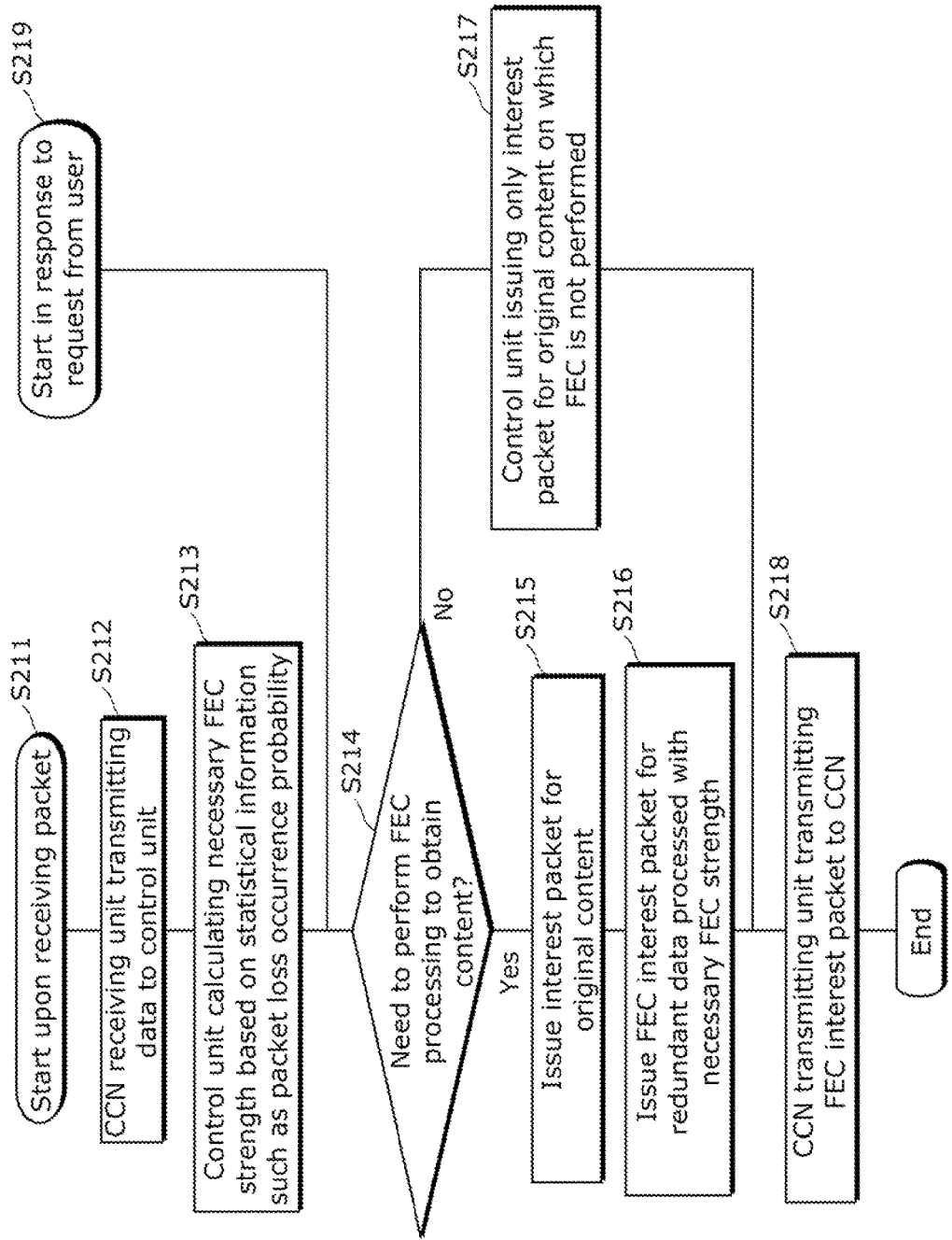
FIG. 14 is a diagram showing a process flow through which a receiving terminal issues an interest packet for original content data and an FEC interest packet for redundant data in Embodiment 2.

FIG. 14 is a diagram showing a process flow through which the receiving terminal 14A issues an interest packet for original content data and an FEC interest packet for redundant data in Embodiment 2. It is to be noted that the process flow shown in FIG. 14 corresponds to detailed S21 and S22 shown in FIG. 13.

First, the control unit 143 starts upon receiving a packet (packet arrival) or in response to a request from the user (S211, S219). The following first describes a case where the control unit 143 starts upon packet arrival.

S211 to S213 and S214 are the same as S111 to S113 and S115 described in FIG. 7, and thus a description thereof is omitted.

When it is determined that the FEC is necessary for content for which an interest packet is issued next in S214 (Yes in S214), the control unit 143 issues an interest packet for original content data (S215) and an FEC interest packet for redundant data on which the FEC is performed with necessary FEC strength (S216). It is to be noted either one of S215 and S216 may be performed first.

Here, the control unit 143 issues the FEC interest packet in which a time stamp at a packet issuance time is included in addition to the FEC strength. Including the time stamp in the FEC interest packet makes it possible to use the time stamp for measuring a RTT from when the FEC interest packet is issued to when content is received. In this embodiment, the control unit 143 issues, as the FEC interest packet, an interest packet for a namespace having a prefix of redundant data. In contrast, when it is determined that the FEC is unnecessary in S214 (No in S214), the control unit 143 issues only the interest packet for the original content data (S217). Here, the control unit 143 issues an interest packet for original content data in which a time stamp at a packet issuance time is included.

Next, the CCN transmitting unit 141 transmits, to the CCN 13, the interest packet (interest packet, FEC interest packet, or the like) created by the control unit 143 (S218).

It is to be noted that when the control unit 143 starts in response to the request from the user (S219), the control unit 143 advances to the process in S214 immediately after the start. The subsequent processes are as described above, and thus a description thereof is omitted.

It is to be noted that structures of the interest packets and the FEC interest packet issued in S215 to S217 are the same as those described in Embodiment 1, and thus a description thereof is omitted.

Moreover, an interest packet for original content data issued in S1206 and S1210 can be defined in the same manner as an interest packet 701 shown in FIG. 7.

[Operation of Processing Server]

Next, a process flow from when the processing server 12A receives an FEC interest packet for redundant data to when the processing server 12A transmits the redundant data corresponding to the FEC interest packet for redundant data will be described using FIG. 15. It is to be noted that this process flow corresponds to detailed S28, S30, and S31 shown in FIG. 13.

Figure 15:
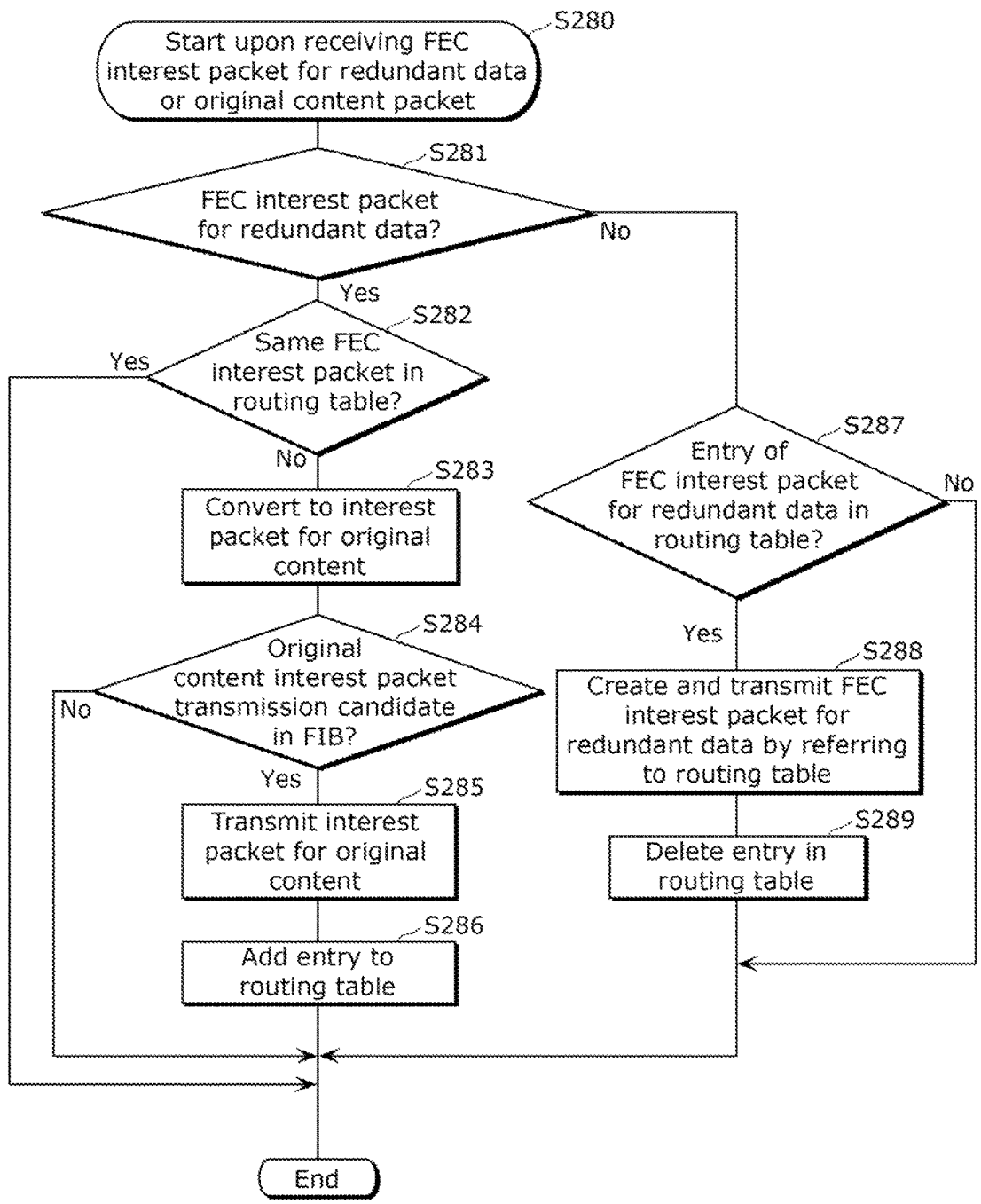
FIG. 15 is a diagram showing a process flow until a processing server transmits redundant data in Embodiment 2.

FIG. 15 is a diagram showing a process flow until a processing server transmits redundant data in Embodiment 2.

FIG. 15 differs from FIG. 9 described in Embodiment 1 in that an FEC interest packet for content on which the FEC is performed and a data packet of FEC content to be transmitted after the FEC is performed are replaced with an FEC interest packet for redundant data and a data packet of redundant data, respectively.

First, the processing server 12A starts upon receiving an FEC interest packet for redundant data or an original content packet (S280), and determines whether what is received is an FEC interest packet for redundant data (S281).

Subsequently, a case will be described where in S280 the processing server 12A receives a content packet as a response to an interest packet for original content data transmitted in S285, for instance.

When the processing server 12A determines that what is received by the processing server 12A is not the FEC interest packet for the redundant data in S281 (No in S281), the processing server 12A determines whether an entry of the FEC interest packet for the redundant data is in a routing table (S287).

When the processing server 12A determines that the entry of the FEC interest packet for the redundant data is in the routing table (Yes in S287), the processing server 12A creates an FEC interest packet for redundant data by referring to the routing table, and causes the CCN transmitting unit 125 to transmit the FEC interest packet for the redundant data (S288).

Next, the processing server 12A deletes the entry of the transmitted FEC interest packet for the redundant data, from the routing table (S289).

In contrast, when the processing server 12A determines that the entry of the FEC interest packet for the redundant data is not in the routing table in S287 (No in S287), the processing server 12A discards a received original content packet and terminates the processing.

It is to be noted that S282 to S286 are the same as S161 to S166 in FIG. 9, and thus a description thereof is omitted.

Moreover, the FEC interest packet for the redundant data transmitted in S288 is received by the receiving terminal 14A. The receiving terminal 14A makes it possible to perform erasure correction by decoding the redundant data together with the original content data obtained in S24.

[Effect]

As described above, according to this embodiment, it is possible to provide the server and the processing method performed by the server that make it possible to ensure the real-time property of obtaining content data.

Moreover, it is possible to perform, by using the server in this embodiment, the content distribution of which the real-time property is required, at a high level of quality without increasing the load of the publisher in an environment where packet loss occurs in the CCN.

(Embodiment 3)

A case where the processing server has no content cache has been described in Embodiments 1 and 2. A case where a processing server has a content cache will be described in Embodiment 3. It is to be noted that the configuration and operation of the receiving terminal and the structure of each packet are as described in Embodiments 1 and 2, and thus a description thereof is omitted.

[Configuration of Processing Server 12]

Unlike the processing server 12 in Embodiment 1, the processing server 12 in this embodiment includes a content cache that temporarily stores received content data. Specifically, the processing server 12 further includes a content cache that holds at least one of original content data converted by the converting unit 122 and original content data received by the CCN receiving unit 123. This content cache is used for converting original content data or for a response packet for an interest packet for converted content.

It is to be noted that the other structural components of the processing server 12 in this embodiment are the same as those of the processing server 12 in Embodiment 1, and thus a description thereof is omitted.

[Process Flow Until Processing Server 12 Transmits Converted Content Data]

A process flow from when the processing server 12 receives a post-conversion interest packet to when the processing server 12 transmits converted content data corresponding to the post-conversion interest packet will be described using FIG. 16. Hereinafter, as an example, a case will be described where the FEC is performed as the converting.

Figure 16:
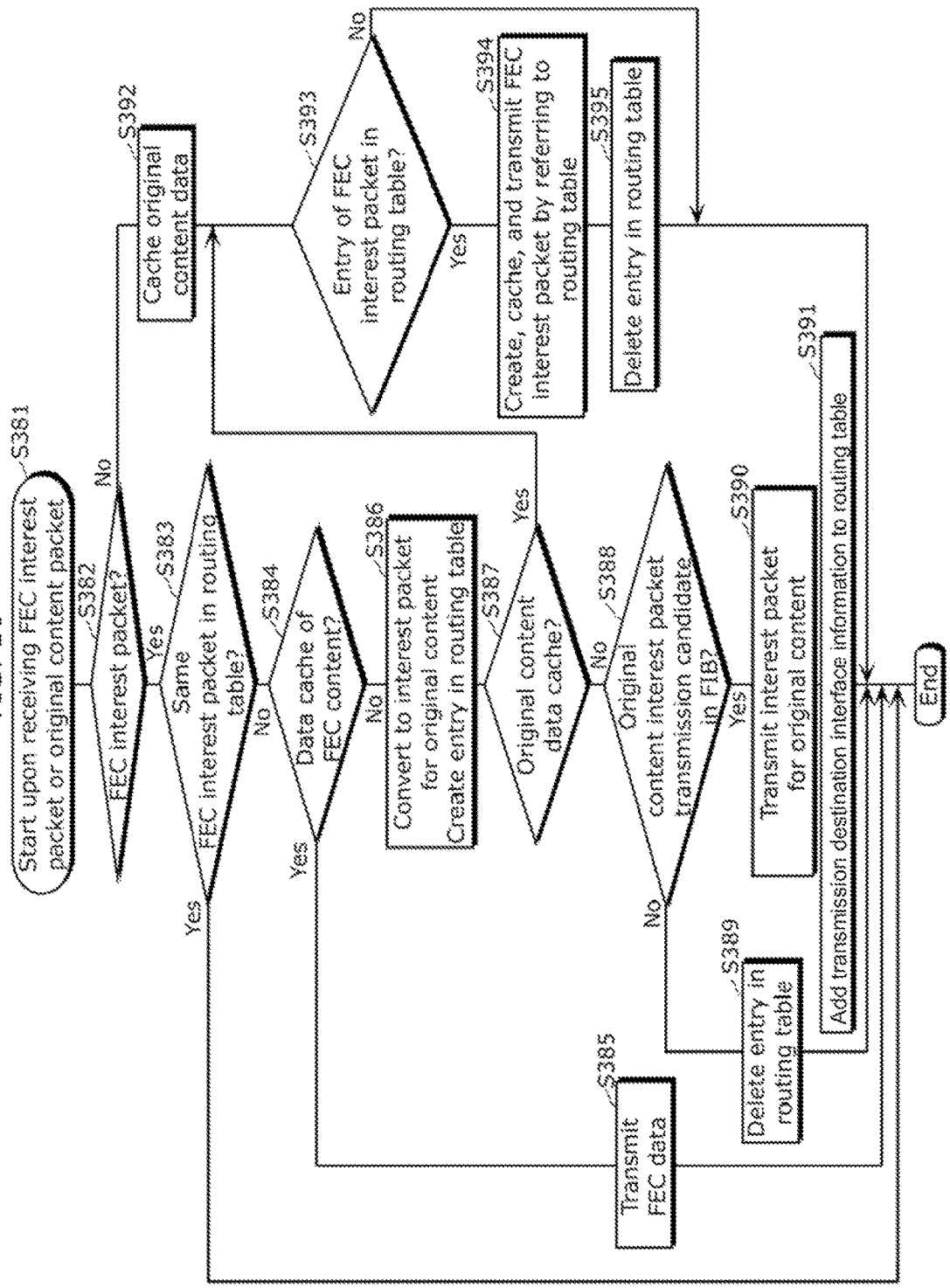
FIG. 16 is a diagram showing a process flow until a processing server transmits converted content data in Embodiment 3.

FIG. 16 is a diagram showing a process flow until a processing server transmits converted content data in Embodiment 3.

First, the processing server 12 starts upon receiving an FEC interest packet or an original content packet (S381), and determines whether what is received is an FEC interest packet (S382).

When the processing server 12 determines that what is received by the processing server 12 is the FEC interest packet in S382 (Yes in S382), the processing server 12 determines whether the processing server 12 has previously received the same FEC interest packet as the FEC interest packet (S383). In this embodiment, the processing server 12 determines whether the processing server 12 has previously received the same FEC interest packet as the FEC interest packet, by determining whether the same FEC interest packet is in a routing table. It is to be noted that when the processing server 12 determines that an entry of the same FEC interest packet is in the routing table in S383 (Yes in S383), the processing server 12 discards an interest packet and terminates the processing.

When the processing server 12 does not determine that the entry of the same FEC interest packet is in the routing table in S383 (No in S383), the processing server 12 determines whether data of FEC content is cached in the content cache of the processing server 12 (S384).

When the processing server 12 determines that the data of the FEC content is cached in the content cache of the processing server 12 in S384 (Yes in S384), the processing server 12 causes the CCN transmitting unit 125 to transmit the cached FEC content (S385) and terminates the processing.

In contrast, when the processing server 12 does not determine that the data of the FEC content is cached in the content cache of the processing server 12 in S384 (No in S384), the processing server 12 converts the FEC interest packet into an interest packet for original content and creates an entry in the routing table (S386).

Next, the processing server 12 determines whether data of the original content is cached in the content cache of the processing server 12 (S387).

When the processing server 12 does not determine that the data of the original content is cached in the content cache of the processing server 12 in S387 (No in S387), the processing server 12 determines whether a transmission destination candidate of the interest packet for the original content converted in S386 is in an FIB (S388).

When the processing server 12 determines that the transmission destination candidate of the interest packet for the original content converted in S386 is not in the FIB in S388 (No in S388), the processing server 12 deletes the entry from the routing table (S389) and terminates the processing.

In contrast, when the processing server 12 determines that the transmission destination candidate of the interest packet for the original content converted in S386 is in the FIB in S388 (Yes in S388), the processing server 12 causes the CCN transmitting unit 125 to transmit the interest packet for the original content (S390), adds transmission destination face information to the routing table (S391), and terminates the processing.

When the data of the original content is cached in the content cache of the processing server 12 in S387, the result of the determination is Yes and the processing proceeds to determination S1413.

When the entry of the FEC interest packet is in the routing table in S393, the result of the determination is Yes, the converting unit 122 generates FEC content data by referring to the routing table, creates an FEC interest packet, and stores the FEC interest packet in the content cache, and the CCN transmitting unit 125 is caused to transmit the FEC interest packet in S394 (S394). Subsequently, the entry is deleted from the routing table (S395).

When the entry of the FEC interest packet is not in the routing table in S393, the result of the determination is No and the processing is terminated.

It is to be noted that when the processing server 12 starts upon receiving an original content packet in S381, the processing server 12 determines that what is received by the processing server 12 is not the FEC interest packet in S382 (No in S382), and the processing server 12 obtains original content data and caches the received original content data in S392.

Next, the processing server 12 determines whether an entry of the FEC interest packet is in the routing table (S393).

When the processing server 12 does not determine that the entry of the FEC interest packet is in the routing table in S393 (No in S393), the processing server 12 terminates the processing.

In contrast, when the processing server 12 determines that the entry of the FEC interest packet is in the routing table in S393 (Yes in S393), the processing server 12 causes the converting unit 122 to create an FEC interest packet by referring to the routing table, stores the created FEC interest packet in the content cache, and causes the CCN transmitting unit 125 to transmit the FEC interest packet (S394).

Next, the processing server 12 deletes the entry from the routing table (S395) and terminates the processing.

It is to be noted that when the processing server 12 determines that the data of the original content is cached in the content cache of the processing server 12 in S387 (Yes in S387), the processing server 12 advances to S393 and performs a process. The processes subsequent to S393 are as described above, and thus a description thereof is omitted.

[Effect]

As described above, according to this embodiment, it is possible to provide the server and the processing method performed by the server that make it possible to ensure the real-time property of obtaining content data.

Moreover, it is possible to perform, by using the server in this embodiment, the content distribution of which the real-time property is required, at a high level of quality without increasing the load of the publisher in an environment where packet loss occurs in the CCN.

It is to be noted that it is possible to switch to the method in which the processing server 12 processes only the redundant data and which is described in Embodiment 2, by reading part described as an FEC interest packet as redundant data in FIG. 16.

Moreover, the processing server 12 may further have functions to perform route advertisement for original content data held in the content cache and to return an original content packet when receiving an interest packet for the original content data.

(Embodiment 4)

Although that only the receiving terminal issues the post-conversion interest packet such as an FEC interest packet has been described in Embodiments 1 to 3, the present invention is not limited to this. Moreover, that the processing server generates the converted content data has been described, the present invention is not limited to this.

In Embodiment 4, a case will be described where each CCN router in the CCN 13 has functions to issue a post-conversion interest packet and generate converted data.

[Configuration of Router 21]

Hereinafter, a detailed configuration of a router 21 will be described using FIG. 17.

Figure 17:
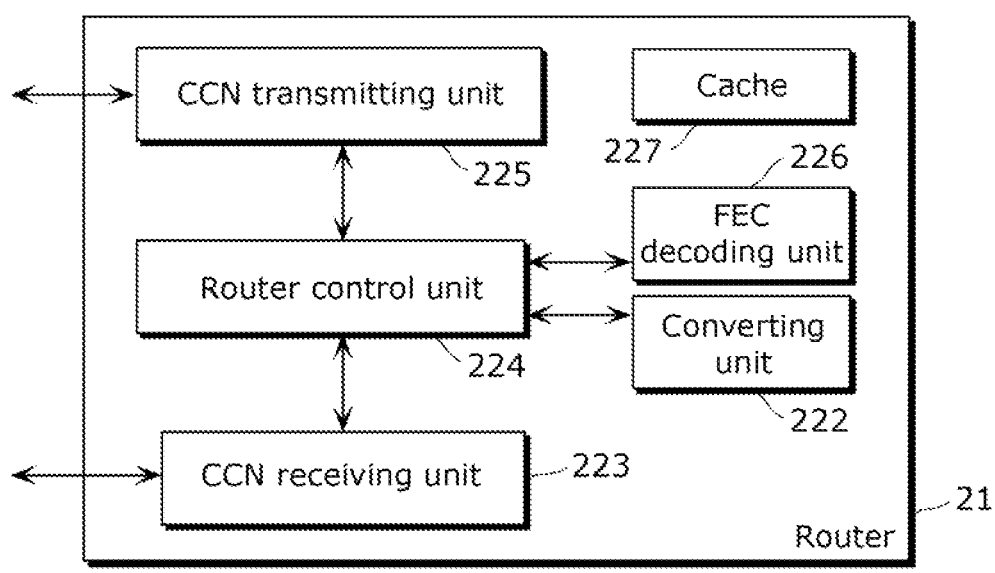
FIG. 17 is a diagram showing an exemplary detailed configuration of a router in Embodiment 4.

FIG. 17 is a diagram showing an exemplary detailed configuration of a router in Embodiment 4. The router 21 shown in FIG. 17 transmits a real-time stream via the CCN 13.

The router 21 shown in FIG. 17 includes a converting unit 222, a CCN receiving unit 223, a router control unit 224, a CCN transmitting unit 225, an FEC decoding unit 226, and a cache 227.

The CCN receiving unit 223 receives a packet from the CCN 13. The CCN transmitting unit 225 transmits an interest packet created by the router control unit 224. As shown in NPL 1, each of the CCN transmitting unit 225 and the CCN receiving unit 223 transmits and receives a packet corresponding to a namespace in the CCN 13, and is connected to the CCN 13.

The FEC decoding unit 226 operates when the converting is the FEC, for instance. The FEC decoding unit 226 is the same as the FEC decoding unit 155 of the receiving terminal 14. The FEC decoding unit 226 decodes a packet of original content data on which the FEC is performed, that is, a response packet for an interest packet transmitted by the CCN transmitting unit 225, and provides recovery from packet loss of the original content data. In other words, the FEC decoding unit 226 performs decoding of received FEC content data to original content data or erasure correction of a packet when packet loss is detected.

The converting unit 222 converts content data to enhance a real-time property and creates a packet of the converted content data.

The converting unit 222 is the same as the converting unit 122 of the processing server 12. The converting unit 222 converts content data to enhance a real-time property and creates a packet of the converted content data. More specifically, the converting unit 222 receives, from the router control unit 224, original content data of content that is received by the CCN receiving unit 223 and to be converted, and converts the original content data to enhance the real-time property.

Here, the converting is the FEC, for instance. In this case, the converting unit 222 creates a packet of original content data on which the FEC is performed by adding redundant data to the original content data to be processed. In other words, the converting unit 222 receives, from the router control unit 224, the original content received by the CCN receiving unit 223, and performs the FEC as the converting.

Moreover, the converting may be the transcoding, for example. In this case, the converting unit 222 performs the transcoding on original content data to be processed and creates a packet of the original content data on which the transcoding is performed. To put it another way, the converting unit 222 receives, from the router control unit 224, the original content received by the CCN receiving unit 223, and performs the transcoding as the converting.

The router control unit 224 controls the converting unit 222, the CCN receiving unit 223, the CCN transmitting unit 225, and the FEC decoding unit 226, and is in charge of control in the router 21.

The router control unit 224 has the function of the control unit 143 of the receiving terminal 14. When content that is converted to enhance the real-time property is necessary, the router control unit 224 issues an interest packet (post-conversion interest packet) for the content converted to enhance the real-time property or an interest packet for a redundant portion resulting from converting content data.

Moreover, when data that is not converted is necessary, the router control unit 224 issues an interest packet for original content before conversion.

Here, a case will be described where the converting is the FEC, for instance. In this case, the router control unit 224 calculates FEC strength necessary to recover lost packets, based on a real-time stream received by the CCN receiving unit 223, and creates an interest packet for content data on which the FEC is performed with the necessary FEC strength. The router control unit 224 calculates the necessary FEC strength from statistical information that is calculated based on the real-time stream received by the CCN receiving unit 223 and includes a packet loss rate, a round trip time (RTT) from when an interest packet is transmitted to when a packet is obtained, and packet obtaining time information for reproducing the real-time stream. Then, the router control unit 224 creates the interest packet for the content data on which the FEC is performed with the FEC strength or an interest packet for a redundant portion of the content data on which the FEC is performed with the FEC strength.

Moreover, the router control unit 224 has the function of the converting unit 122 of the processing server 12, and issues an interest packet for original content in the CCN 13. Furthermore, the router control unit 224 updates a routing table that describes processing for an interest packet.

More specifically, when the CCN receiving unit 223 receives an interest packet (post-conversion interest packet) for converted content, the router control unit 224 issues an interest packet for original content data of content to be converted and causes the CCN transmitting unit 225 to transmit the interest packet. When the CCN receiving unit 223 obtains original content data to be processed from the CCN 13, the router control unit 224 causes the converting unit 222 to covert the original content data and create a packet of the converted original content data, and causes the CCN transmitting unit 225 to transmit the packet as a response packet for an interest packet (post-conversion interest packet) for the converted content.

It is to be noted that the cache 227 stores (caches) original content data received by the router 21, received or generated content data converted by the FEC or the like, and redundant data.

[Operation of Router 21]

Next, a process flow through which the router 21 thus configured issues a post-conversion interest packet will be described. Hereinafter, as an example, a case will be described where the FEC is performed as the converting.

When the router 21 receives, for example, an FEC interest packet and an FEC interest packet for redundant data, the router 21 performs the same processing as in the process flow shown in FIG. 16. However, the start in response to the request from the user in S211 and S219 does not occur.

In other words, the router 21 receives the FEC interest packet (S381 and S382), and when the same FEC interest packet as the received FEC interest packet is in the routing table (Yes in S383), the router 21 discards the packet. When the same FEC interest packet is not in the routing table (No in S383), the router 21 determines, by referring to the cache 227, whether data of FEC content is present (S384).

When the data of the FEC content is in the cache 227 in S384 (Yes in S384), the router 21 transmits FEC data (S385).

In contrast, when the data of the FEC content is not in the cache 227 in S384 (No in S384), the router 21 converts the FEC interest packet into an interest packet for original content and creates an entry in the routing table (S386).

When data of the original content is in the cache 227 in S387 (Yes in S387), the router 21 creates an FEC interest packet by referring to the routing table, transmits the data of the FEC content after caching the data of the FEC content in the cache 227, and deletes the entry from the routing table (Yes in S393, S394 and S395).

When the data of the original content is not in the cache 227 in S387 (No in S387), and a transmission destination candidate (transmission destination face candidate) is in an FIB (Yes in S388), the router 21 transmits the interest packet for the original content (S390), adds transmission destination face information to the routing table (S391), and terminates the processing.

It is to be noted that when the transmission destination candidate is not in the FIB in S388 (No in S388), the router 21 deletes the entry in the routing table (S389) and terminates the processing.

Next, a process flow through which the router 21 thus configured issues an interest packet and a post-conversion interest packet will be described. Hereinafter, as an example, the case will be also described where the FEC is performed as the converting.

When the router 21 receives a packet of content data, the router 21 performs the same processing as in the process flows shown in FIG. 3 and FIG. 14.

To put it another way, the router 21 calculates necessary FEC strength from statistical information such as a rate of the occurrence of packet loss of a packet of content data received by the CCN receiving unit 223 (S213).

When it is determined that the FEC is necessary for content for which an interest packet is issued next in S214 (Yes in S214), the router control unit 224 issues an interest packet for original content data (S215) and an FEC interest packet for redundant data on which the FEC is performed with the necessary FEC strength (S216). At this time, the router 21 describes a correspondence relationship between a received interest packet and a converted FEC interest packet in the routing table. When the FEC is not necessary, a normal interest packet is transferred to obtain the next content.

It is to be noted that FEC strength necessary to obtain each content or the like may be described in an FIB of the router 21. Moreover, the router 21 stores received content data in the cache 227.

It is to be noted that when a packet of content data received by the router 21 corresponds to an FEC interest packet issued by the router 21, it is determined that what is received by the router 21 is not an FEC interest packet in S382 (No in S382), and the router 21 caches data of received original content in the cache 227 in S392.

Next, when the router 21 determines that an entry of the FEC interest packet is in the routing table in S393 (Yes in S393), the router 21 causes the converting unit 222 to create an FEC interest packet by referring to the routing table, and transmits the FEC interest packet after caching the FEC interest packet in the cache 227 (S394). Subsequently, the router 21 deletes the entry from the routing table (S395) and terminates the processing.

It is to be noted that when the router 21 receives an interest packet for normal content on which the converting such as the FEC is not performed, and when, like a normal CCN router, the router 21 holds, in the cache 227 of the same, content data corresponding to a namespace of the received interest packet, the router 21 returns the content data to a face that receives an interest packet. When the corresponding content data is not in the cache 227 of the router 21, the router 21 transfers an interest packet to the CCN 13 according to information in the FIB of the router 21.

[Effect]

As described above, according to this embodiment, it is possible to provide the router and the processing method performed by the router that make it possible to ensure the real-time property of obtaining content data.

Moreover, it is possible to perform, by using the router in this embodiment, the content distribution of which the real-time property is required, at a high level of quality without increasing the load of the publisher in an environment where packet loss occurs in the CCN.

(Embodiment 5)

NPL 1 discloses a technique that allows a router having content to perform route advertisement to the router, using a routing protocol such as OSPF and IS-IS.

In view of this, in this embodiment, a case will be described where processing is dispersed to make effective use of a processing resource of a processing server in a CCN 13, using a technique of route advertisement. More specifically, in this embodiment, a case will be described, using FIG. 18, where a processing server 12 causes a server load monitoring unit 121 to monitor a remaining processing capacity of the processing server 12, and causes a CCN transmitting unit 125 to put the remaining processing capacity in the route advertisement and distribute the route advertisement.

A configuration of the processing server 12 is the same as the one shown in FIG. 3, and thus a description thereof is omitted.

[Route Advertisement Packet Issued by Processing Server]

FIG. 18 is a diagram showing a process flow through which a processing server issues a route advertisement packet and a CCN router receives the route advertisement packet in Embodiment 5.

First, the server load monitoring unit 121 starts by timer (S41).

Next, the server load monitoring unit 121 measures a processing load of the processing server 12 (S42), and creates a route advertisement including the measured processing load (S43).

Next, the CCN transmitting unit 125 transmits a packet of the route advertisement created by the server load monitoring unit 121, to the CCN 13 (S44).

Then, the packet of the route advertisement is received by an adjacent CCN router (S45), and a request to the processing server 12 for conversion is increased or decreased according to the advertised remaining capacity of the processing server 12.

For instance, when the remaining processing capacity of the processing server 12 indicated in information included in the packet of the route advertisement is large (when the load of the processing server 12 is heavy), the adjacent CCN router receiving the packet of the route advertisement sets a cost of a route from the adjacent CCN router to the processing server 12 to be small. Conversely, when the remaining processing capacity of the processing server 12 indicated in the information included in the packet of the route advertisement is small, the adjacent CCN router receiving the packet of the route advertisement sets the cost of the route from the adjacent CCN router to the processing server 12 to be large.

[Effect]

As described above, according to this embodiment, it is possible to provide the server and the processing method performed by the server that make it possible to ensure the real-time property of obtaining content data.

Moreover, it is possible to perform, by using the server in this embodiment, the content distribution of which the real-time property is required, at a high level of quality without increasing the load of the publisher in an environment where packet loss occurs in the CCN.

Specifically, the adjacent CCN router receiving the packet of the route advertisement decreases the number of times the processing server 12 having the large cost of the route transfers a post-conversion interest packet such as an FEC interest packet and an FEC interest packet for redundant data. In contrast, the adjacent CCN router receiving the packet of the route advertisement increases the number of times the processing server 12 having the small cost of the route transfers an FEC interest packet, an FEC interest packet for redundant data, and so on.

It is to be noted that the adjacent CCN router may control a transfer amount of a post-conversion interest packet such as an FEC interest packet and an interest packet for redundant data, in two stages of transferring and not-transferring using a route cost and a threshold value.

Moreover, when each adjacent CCN router receives a route advertisement, a cost of a route to the processing server 12 set by the adjacent CCN router may be described in an FIB of the adjacent CCN router.

Furthermore, when the adjacent CCN router receives information about a remaining processing capacity of the processing server 12, details of packet transfer control by the adjacent CCN router may be described in an extension header of a packet of a route advertisement transmitted from a processing server 1601.

As described above, according to the server, the router, the receiving terminal, and the processing method performed by the server, the router, and the receiving terminal make it possible to ensure the real-time property of obtaining content data. Moreover, it is possible to perform, by using the server and the router in this embodiment, the content distribution of which the real-time property is required, at a high level of quality without increasing the load of the publisher in an environment where packet loss occurs in the CCN.

Although the server, the router, the receiving terminal, and the processing method performed by the server, the router, and the receiving terminal according to aspects of the present invention have been described based on the embodiments, the present invention is not limited to the embodiments. Those skilled in the art will readily appreciate that various modifications may be made in the embodiments and that other embodiments may be obtained by combining the structural elements in the different embodiments, without departing from the spirit of the present invention. Accordingly, all such modifications and embodiments may be included in the scope of one or more of the aspects of the present invention.

For example, the following cases are also included in the present invention.

(1) Each of the above-described server, router, and receiving terminal (hereinafter collectively referred to as each of the devices) is specifically a computer system including a microprocessor, a ROM, a RAM, a hard disk unit, a display unit, a keyboard, a mouse, and the like. A computer program is stored in the RAM or the hard disk unit. The microprocessor operates according to the computer program, so that each of the devices carries out its function. Here, the computer program is programmed by combining plural instruction codes each of which indicates an instruction for a computer, to carry out predetermined functions.

(2) Part or all of the structural elements included in each of the devices may be realized as a single system Large Scale Integration (LSI). The system LSI is a super multifunctional LSI manufactured by integrating a plurality of components onto a single chip. Specifically, the system LSI is a computer system including a microprocessor, a ROM, a ROM, and so on. A computer program is stored in the RAM. The microprocessor operates according to the computer program, so that the system LSI carries out its function.

(3) Part or all of the structural elements included in each of the devices may be implemented as an IC card or a stand alone module that can be inserted into and removed from each device. The IC card or the module is a computer system including a microprocessor, a ROM, a RAM, and so on. The IC card or the module may include the aforementioned super multifunctional LSI. The microprocessor operates according to a computer program, so that the IC card or the module carries out its function. The IC card or the module may be tamper resistant.

(4) The present invention may be realized by any of the above-described methods. Moreover, the present invention may be realized by a computer program which causes a computer to execute these methods, or by a digital signal which is composed of the computer program.

Furthermore, the present invention may be realized by a computer program or a digital signal recorded on a computer-readable recording medium such as a flexible disk, a hard disk, a CD-ROM, an MO, a DVD, a DVD-ROM, a DVD-RAM, a Blu-ray (registered trademark) Disc (BD), and a semiconductor memory. Also, the present invention may be realized by a digital signal recorded on these recording media.

Moreover, the present invention may be realized by a computer program or a digital signal transmitted via an electric telecommunication line, a wireless or wired communication line, a network represented by the Internet, data broadcasting, and so on.

Furthermore, the present invention may be a computer system including a microprocessor and a memory. The memory may store a computer program, and the microprocessor may operate according to the computer program.

Moreover, by transferring the recording medium having the program or the digital signal recorded thereon or by transferring the program or the digital signal via the network or the like, the present invention may be implemented by a different independent computer system.

(5) The above-described embodiments and modification may be combined with each other.

INDUSTRIAL APPLICABILITY

The present invention can be applied to, for instance, servers, routers, and receiving terminals, and particularly to, for example, a server, a router, and a receiving terminal that are included in a content distribution system that distributes video content or the like in real time.

REFERENCE SIGNS LIST 1, 900 Content distribution system
11, 903, 905 CCN router
12, 12A Processing server
13, 904 CCN
14, 14A Receiving terminal
21 Router
43, 61 Interest packet
44, 45, 46, 47, 71, 72 FEC interest packet
51 Routing table
121 Server load monitoring unit
122, 222 Converting unit
123, 142, 223 CCN receiving unit
124 Server control unit
125, 141, 225 CCN transmitting unit
143 Control unit
144 Video decoder
155, 226 FEC decoding unit
224 Router control unit
228, 907, 912 Cache
401 to 410, 413 to 422 Data packet
411, 412, 423 to 428 Redundant packet
431, 432, 433, 441, 442, 443, 451, 452, 453, 454, 461, 462, 463, 471, 472, 473, 474, 611, 612, 711, 712, 713, 714, 715, 721, 722, 723, 724 Field
511 FEC interest packet information
512 Original content interest packet information
513 Incoming face information
514 Outgoing face information
901 Publisher
902 Content
906, 911 PIT
908, 913 FIB
909 Content receiver B
910 Content receiver A

The invention claimed is:

1. A server that processes a real-time stream transmitted via a content centric network (CCN) which is a network for managing content with a namespace and cached content in a router in the CCN, the server comprising:
a CCN receiving unit in the server to receive an original content packet from the CCN;
a CCN transmitting unit in the server to transmit a converted content packet to the CCN;
a converting unit in a processor within the server to convert, at an OSI Layer 4 or above, given original content data into converted content data to enable an enhanced successful transmission in real-time of the given original content data, and create the converted content packet including the converted content data; and
a server control unit in the processor to update a routing table that describes processing for an interest packet having a namespace corresponding to the given original content data,
wherein when the CCN receiving unit receives an interest packet having a namespace corresponding to content including the converted content data, the server control unit in the processor issues an interest packet having a namespace corresponding to the given original content data of the content which is to be converted, and causes the CCN transmitting unit to transmit the issued interest packet;
wherein when the CCN receiving unit receives from the CCN the given original content data to be converted, the server control unit causes the converting unit to convert the given original content data and create the converted content packet including the converted content data, and causes the CCN transmitting unit to transmit the converted content packet including the converted content data as a response packet for the received interest packet having the namespace corresponding to the content including the converted content data; and
wherein the converting is forward error correction (FEC), such that the converting unit performs the FEC on the given original content data to be converted, at the OSI Layer 4 or above, by adding redundant data to the given original content data, to create the converted content packet including the converted content data on which the FEC is performed, the interest packet being an FEC interest packet.

2. The server according to claim 1,
wherein the converting additionally includes transcoding, such that the converting unit performs the transcoding on the given original content data to be converted, to create the converted content packet including the converted content data on which the transcoding is performed, the interest packet being a transcoding interest packet.

3. The server according to claim 1, further comprising
a content cache in communication with the server control unit in the processor to hold at least one of the converted content data converted by the converting unit, and the given original content data received by the CCN receiving unit,
wherein the content cache provides the given original content data to the converting unit, or caches the converted content data in the response packet.

4. The server according to claim 1, further comprising
a server load monitoring unit in the processor to monitor a load on the server, wherein the server load monitoring unit creates a route advertisement packet including at least load information indicating a current load on the server, and cause transmission of the route advertisement packet to the CCN via the CCN transmitting unit.

5. A router that transmits a real-time stream via a content centric network (CCN) which is a network for managing content with a namespace and cached content in routers in the CCN, the router comprising:
- a CCN receiving unit in the router to receive an original content packet from the CCN;
- a CCN transmitting unit in the router to transmit a converted content packet to the CCN;
- a converting unit in a processor within the router to convert, at an OSI Layer 4 or above, given original content data into converted content data to enable an enhanced successful transmission in real-time of the given original content data, and create the converted content packet including the converted content data; and
- a router control unit in the processor to update a routing table that describes processing for an interest packet having a namespace corresponding to the given original content data, and create a first interest packet for the converted content data or a second interest packet for a redundant portion of the converted content data,
- wherein when the CCN receiving unit receives an interest packet having a namespace corresponding to content including the converted content data, the router control unit in the processor issues an interest packet having a namespace corresponding to the given original content data of the content which is to be converted, and causes the CCN transmitting unit to transmit the issued interest packet;
- wherein when the CCN receiving unit receives from the CCN the given original content data to be converted, the router control unit causes the converting unit to convert the given original content data and create the converted content packet including the converted content data, and cause the CCN transmitting unit to transmit the converted content packet including the converted content data as a response packet for the received interest packet having the namespace corresponding to the content including the converted content data; and
- wherein the converting is forward error correction (FEC), such that the converting unit performs the FEC on the given original content data to be converted, at the OSI Layer 4 or above, by adding redundant data to the given original content data, to create the converted content packet including the converted content data on which the FEC is performed, the interest packet being an FEC interest packet.

6. The router according to claim 5,
- wherein the router control unit determines a necessary FEC strength from statistical information and creates the first interest packet for the given original content data on which the FEC is performed with the necessary FEC strength or the second interest packet for the redundant portion of the converted content data on which the FEC is performed with the FEC strength, the statistical information being based historically on real-time streams received by the CCN receiving unit, and including a packet loss rate, a round trip time (RTT) from when an interest packet is transmitted to when a responsive packet is received, and packet receiving time information for reproducing the real-time stream.

7. A method performed by a server that processes a real-time stream transmitted via a content centric network (CCN) which is a network for managing content with a namespace and cached content in a router in the CCN, the processing method comprising:
- receiving an original content packet from the CCN;
- converting, in a processor within the server, at an OSI Layer 4 or above, given original content data into converted content data to enable an enhanced successful transmission in real-time of the given original content data, and create the converted content packet including the converted content data;
- updating, by the processor, a routing table that describes processing for an interest packet having a namespace corresponding to the given original content data,
- wherein when an interest packet having a namespace corresponding to content including the converted content data is received from the CCN, issuing, from the processor, an interest packet having a namespace corresponding to content including the converted content data, and transmitting the issued interest packet to the CCN;
- wherein when the given original content data to be converted is received from the CCN, converting, in the processor, the given original content data and creating the converted content packet including the converted content data, and transmitting the converted content packet including the converted content data as a response packet for the received interest packet having the namespace corresponding to the content including the converted content data; and
- wherein the converting is forward error correction (FEC), such that FEC is performed on the given original content data to be converted, at OSI Layer 4 or above, by adding redundant data to the given original content data, to create the converted content packet including the converted content data on which the FEC is performed, the interest packet being an FEC interest packet.

8. A method performed by a router that transmits a real-time stream via a content centric network (CCN) which is a network for managing content with a namespace and cached content in a router in the CCN, the processing method comprising:
- receiving an original content packet from the CCN;
- converting, in a processor within the router, at an OSI Layer 4 or above, given original content data into converted content data to enable an enhanced successful transmission in real-time of the given original content data, and to create the converted content packet including the converted content data;
- updating, by the processor, a routing table that describes processing for an interest packet having a namespace corresponding to the given original content data, and creating a first type interest packet for the converted content data or a second type interest packet for a redundant portion of the converted content data,
- wherein when an interest packet having a namespace corresponding to content including the converted content data is received from the CCN, issuing, from the processor, an interest packet having a namespace corresponding to content including the converted content data, and transmitting the issued interest packet to the CCN;
- wherein when the given original content data to be converted is received from the CCN, converting, in the processor, the given original content data and creating the converted content packet including the converted content data, and transmitting the converted content packet including the converted content data as a response packet for the received interest packet having the namespace corresponding to the content including the converted content data; and wherein the converting is forward error correction (FEC), such that FEC is performed on the given original content data to be converted, at OSI Layer 4 or above, by adding redundant data to the given original content data, to create the converted content packet including the converted content data on which the FEC is performed, the interest packet being an FEC interest packet.

* * * * *